United States Patent
Kubotani et al.

(10) Patent No.: US 8,041,494 B2
(45) Date of Patent: Oct. 18, 2011

(54) DANGEROUS DRIVE PREDICTING APPARATUS

(75) Inventors: Hiroyuki Kubotani, Kanagawa (JP); Makoto Mochizuki, Kanagawa (JP); Koji Arata, Kanagawa (JP); Toshihiro Sota, Kanagawa (JP); Kazuhiko Iwai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 795 days.

(21) Appl. No.: 12/097,138

(22) PCT Filed: Dec. 11, 2006

(86) PCT No.: PCT/JP2006/324678
§ 371 (c)(1),
(2), (4) Date: Jun. 12, 2008

(87) PCT Pub. No.: WO2007/069568
PCT Pub. Date: Jun. 21, 2007

(65) Prior Publication Data
US 2009/0292413 A1    Nov. 26, 2009

(30) Foreign Application Priority Data
Dec. 14, 2005  (JP) ................................. 2005-360759

(51) Int. Cl.
*G08G 1/16*    (2006.01)
(52) U.S. Cl. ........... 701/96; 701/301; 340/903; 340/435
(58) Field of Classification Search .......... 701/117–119, 701/96, 300–302; 340/435–436, 901–903, 340/500, 438; 342/70
See application file for complete search history.

(56) References Cited

U.S. PATENT DOCUMENTS

| 6,442,453 | B1 * | 8/2002 | Fukuoka | 701/1 |
| 7,124,027 | B1 * | 10/2006 | Ernst et al. | 701/301 |
| 7,474,961 | B2 * | 1/2009 | Ibrahim | 701/209 |
| 7,751,973 | B2 * | 7/2010 | Ibrahim | 701/213 |
| 7,966,127 | B2 * | 6/2011 | Ono et al. | 701/300 |

FOREIGN PATENT DOCUMENTS

| JP | 2003-058994 | 2/2003 |
| JP | 2003-081038 | 3/2003 |
| JP | 2004-157880 | 6/2004 |

OTHER PUBLICATIONS

International Search Report Dated Jan. 9, 2007.

* cited by examiner

*Primary Examiner* — Yonel Beaulieu
(74) *Attorney, Agent, or Firm* — Pearne & Gordon LLP

(57) ABSTRACT

A dangerous drive predicting apparatus is provided which is capable of rapidly recognizing a future situation of the own vehicle by other vehicles. The dangerous drive predicting apparatus is equipped with: drive information detecting section 110 for detecting drive information containing at least one of a drive action and vehicle information; traffic environment detecting section 120 for detecting a traffic environment around a first vehicle; driving characteristic producing/storing section 130 for producing and storing a driving characteristic every traffic environment based upon the drive information and the traffic environment; and a driving characteristic transmitting section for transmitting the driving characteristic to a second vehicle.

19 Claims, 14 Drawing Sheets

1001

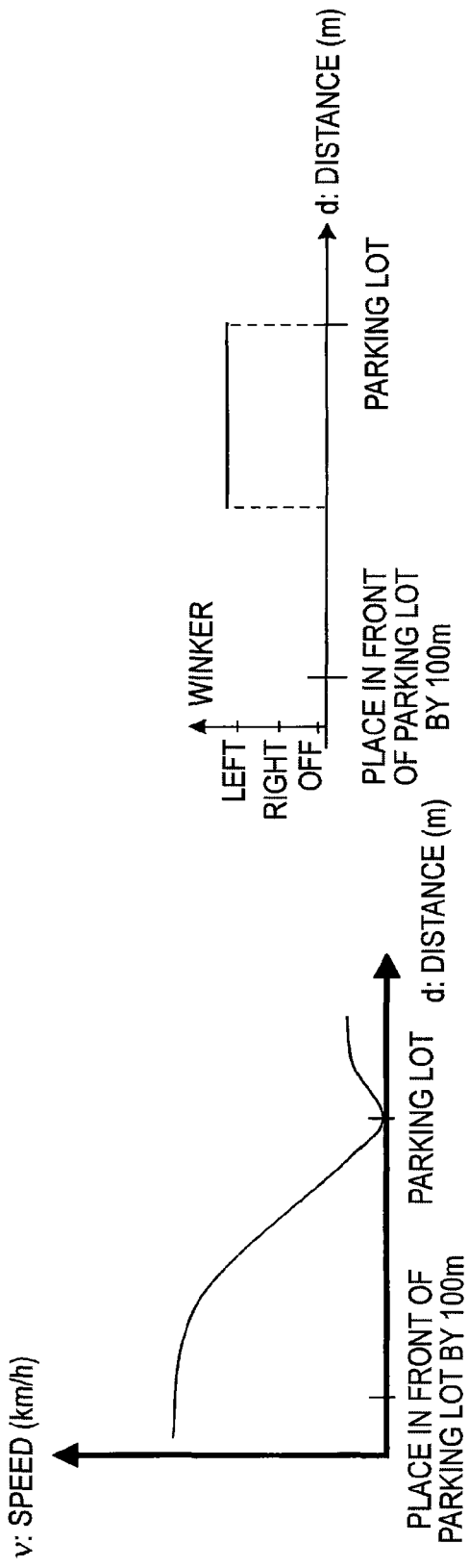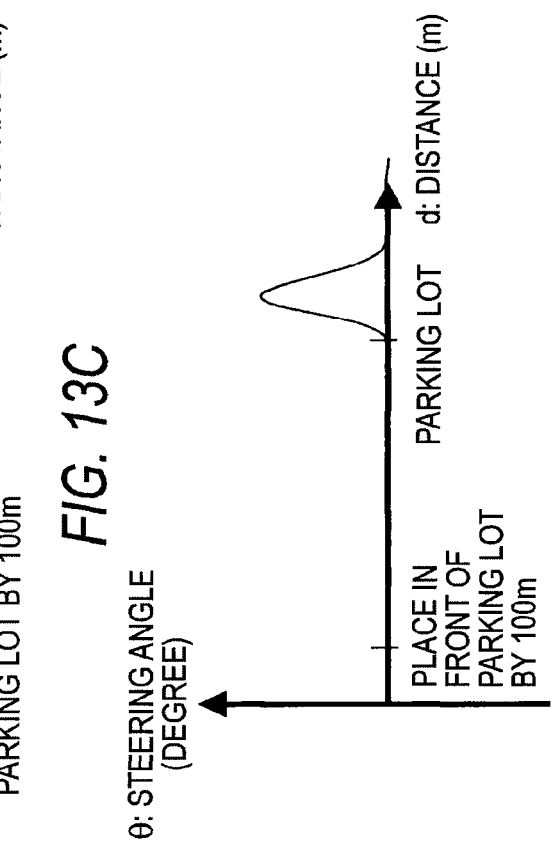

DANGEROUS DRIVE PREDICTING APPARATUS

TECHNICAL FIELD

The present invention is related to a dangerous drive predicting apparatus and a dangerous drive predicting method.

BACKGROUND ART

Conventionally, vehicle driver's future situation predicting apparatuses are known in technical fields. That is, in such a case that a vehicle (own vehicle) driven by a driver thereof, and other vehicles (other vehicles) which are driven at peripheral areas of the own vehicle are present, the vehicle driver's future situation predicting apparatuses evaluate driving characteristics based upon not only drive conditions of the own vehicle, but also drive conditions of other vehicles, and thus, accurately predict the degree of accuracy at which vehicle drivers will encounter with unexpected events in a future.
Patent Publication 1: JP-A-2003-058994

DISCLOSURE OF THE INVENTION

Problems that the Invention is to Solve

However, in the conventional vehicle drivers future situation predicting apparatuses, the own vehicle receives drive situations of other vehicles from these other vehicles; dangerous degrees caused by drives between the own vehicle and other vehicles are calculated based upon the reception result, and thereafter, the calculated dangerous degrees are notified to other vehicles. As a result, there is such a problem that a lengthy time is required until other vehicles can recognize future situations of the own vehicle.

The present invention has been made to solve the above-described problem, and therefore, has an object to provide a dangerous drive predicting apparatus and a dangerous drive predicting method, capable of rapidly recognizing a future situation of the own vehicle by other vehicles.

Means for Solving the Problems

In order to achieve the above-described object, according to the present invention, there is provided a dangerous drive predicting apparatus, comprising:

a drive information detecting section that detects drive information which includes at least one of a drive action and vehicle information, the drive action having an operation to a first vehicle by a vehicle driver, and the vehicle information having a condition of the first vehicle in connection with the drive action;

a traffic environment detecting section that detects a traffic environment around the first vehicle;

a driving characteristic producing section that produces a driving characteristic indicative of a trend of the drive action by the vehicle driver every traffic environment under which the drive action is carried out on the basis of the drive information detected by the drive information detecting section and the traffic environment detected by the traffic environment detecting section;

a driving characteristic storage section that stores the driving characteristic produced by the driving characteristic producing section; and a driving characteristic transmitting section that transmits the driving characteristic stored in the driving characteristic storage section to a second vehicle.

With the above-described arrangement, another vehicle can rapidly recognize the future situations of the own vehicle.

Also, in a second dangerous drive predicting apparatus of the present invention, the driving characteristic producing section produces the driving characteristic with respect to each of the vehicle drivers, who executes the drive action.

With the above-described arrangement, since the driving characteristic is produced every vehicle driver, these driving characteristics can be utilized as the useful data for the vehicle driver.

Also, a third dangerous drive predicting apparatus of the present invention, further comprising: a drive condition predicting section that predicts a drive condition under a future traffic environment in accordance with the drive information and the traffic environment on the basis of the driving characteristic, wherein the driving characteristic transmitting section transmits the driving characteristic corresponding to the drive condition to the second vehicle.

With the above-described arrangement, another vehicle transmits the future drive condition of the own vehicle, which has been predicted by the own vehicle, so that another vehicle can quickly recognize the future situation of the own vehicle in a more correct manner.

Also, in a fourth dangerous drive predicting apparatus of the present invention, in a case that the driving characteristic stored in the driving characteristic storage section is different from a driving characteristic related to a previously determined safe driving, the drive information transmitting section transmits the driving characteristic to the second vehicle.

With the above-described arrangement, another vehicle can judge the driving characteristic of the own vehicle related to the safe driving based upon the minimum information, so that another vehicle can recognize the situation of the own vehicle in a higher efficiency.

Also, a fifth dangerous drive predicting apparatus, comprises:

a drive information detecting section that detects drive information which includes at least one of a drive action and vehicle information, the drive action having an operation to a first vehicle by a vehicle driver, and the vehicle information having a condition of the first vehicle in connection with the drive action;

a traffic environment detecting section that detects a traffic environment around the first vehicle;

a driving characteristic producing section that produces a driving characteristic indicative of a trend of the drive action by the vehicle driver every traffic environment under which the drive action is carried out on the basis of the drive information detected by the drive information detecting section and the traffic environment detected by the traffic environment detecting section;

a driving characteristic storage section that stores the driving characteristic produced by the driving characteristic producing section;

a driving characteristic receiving section that receives another vehicle driving characteristic indicative of a driving characteristic of a second vehicle which is transmitted from the second vehicle;

a driving characteristic difference judging section that compares the another vehicle driving characteristic received by the driving characteristic receiving section with the driving characteristic stored in the driving characteristic storage section so as to judge a difference between the another vehicle characteristic and the stored driving characteristic; and a driving characteristic difference providing section that provides the difference judged by the driving characteristic difference judging section with respect to the vehicle driver.

With the above-described arrangement, the driving characteristic as to the vehicle driver of the own vehicle is compared with the driving characteristic as to the vehicle driver of another vehicle under the same traffic environment, and the difference between these driving characteristics can be warned to the driver of the own vehicle, so that an unexpected drive operation of another vehicle can be notified in an earlier stage.

Also, in a sixth dangerous drive predicting apparatus of the present invention, the driving characteristic producing section produces the driving characteristic with respect to each of the vehicle drivers, who executes the drive action.

With the above-described arrangement, since the driving characteristic is produced every vehicle driver, these driving characteristics can be utilized as the useful data for the vehicle driver.

Also, in a seventh dangerous drive predicting apparatus of the present invention, in a case that the another vehicle driving characteristic received by the driving characteristic receiving section is different from a driving characteristic related to a previously determined safe driving, the driving characteristic difference providing section provides difference information related to the difference judged by the driving characteristic difference judging section.

With the above-described arrangement, a difference of the driving characteristics can be presented only in such a case that the difference is present between the vehicle characteristic of another vehicle and the driving characteristic as to the vehicle driver of the own vehicle, and further, the driving characteristic of another vehicle is such a dangerous driving characteristic which is deviated from an ideal driving characteristic by a degree higher than, or equal to a predetermined degree. Thus, only such a feature of the dangerous drive of another vehicle can be presented to the vehicle driver.

Also, in an eighth dangerous drive predicting apparatus of the present invention, the drive action includes at least one of an accelerator manipulating operation, a braking operation, a steering wheel manipulating operation, a winker manipulating operation, and a safety confirming operation with respect to the first vehicle. The driving characteristic producing section produces the driving characteristic related to at least one of the accelerator manipulating operation, the braking operation, the steering wheel manipulating operation, the winker manipulating operation, and the safety confirming operation.

With the above-described arrangement, the driving characteristics can be produced and stored based upon the drive information such as the accelerator manipulating operation, the braking operation, the steering wheel manipulating operation, the winker manipulating operation, and the safety confirming operation, which were carried out by the vehicle driver in the past. Thus, the features as to the accelerator manipulating operation, the braking operation, the steering wheel manipulating operation, the winker manipulating operation, and the safety confirming operation made by the vehicle driver can be stored.

Also, in a ninth dangerous drive predicting apparatus of the present invention, the vehicle information includes at least one of vehicle speed information related to a vehicle speed of the first vehicle, acceleration information related to acceleration thereof, steering angle information related to a steering angle thereof, vehicle position information related to a vehicle position thereof, and vehicle-to-vehicle distance information related to a vehicle-to-vehicle distance thereof. The driving characteristic producing section produces the driving characteristic related to at least one of the vehicle speed information, the acceleration information, the steering angle information, the vehicle position information, and the vehicle-to-vehicle information.

With the above-described arrangement, such driving characteristics can be produced and stored, to which the below-mentioned drive information has been reflected. This drive information covers the vehicle speed information related to the vehicle speed of the vehicle driver, the acceleration information related to the acceleration thereof, the steering angle information related to the steering angle thereof, the vehicle position information related to the vehicle position thereof, and the vehicle-to-vehicle distance information related to the vehicle-to-vehicle distance thereof, which were made in the past. Thus, features of the drive operations acquired from the drive information when the vehicle driver has driven the vehicle can be stored.

Also, in a tenth dangerous drive predicting apparatus of the present invention, the driving characteristic receiving section receives the another vehicle driving characteristic related to at least one of an accelerator manipulating operation, a braking operation, a steering wheel manipulating operation, a winker manipulating operation, and a safety confirming operation with respect to the second vehicle. The driving characteristic difference judging section compares the another vehicle driving characteristic with a driving characteristic stored in the driving characteristic storage section, which corresponds to the another vehicle driving characteristic; and in a case that a result of the comparison indicates that a difference is larger than or equal to a predetermined constant value, the driving characteristic difference judging section judges that the difference is present in the driving characteristic.

With the above-described arrangement, it is possible to judge such a difference between the driving characteristic as to the vehicle driver of the own vehicle and the below-mentioned driving characteristic as to the vehicle driver of another vehicle, while the above-described driving characteristic covers the accelerator manipulating operation, the braking operation, the steering wheel manipulating operation, the winker manipulating operation, and the safety confirming operation. Thus, the unexpected drive of another vehicle can be predicted based upon a difference between the feature of the drive operation made by the vehicle driver of the own vehicle, and the feature of the drive operation made by the vehicle driver of another vehicle.

Also, in an eleventh dangerous drive predicting apparatus of the present invention, the driving characteristic receiving section receives the another vehicle driving characteristic related to at least one of vehicle speed information related to a vehicle speed of the second vehicle, acceleration information related to acceleration thereof, steering angle information related to a steering angle thereof, vehicle position information related to a vehicle position thereof, and vehicle-to-vehicle distance information related to a vehicle-to-vehicle distance thereof. The driving characteristic difference judging section compares the another vehicle driving characteristic with a driving characteristic stored in the driving characteristic storage section, which corresponds to the another vehicle driving characteristic; and in a case that a result of the comparison indicates that a difference is larger than or equal to a predetermined constant value, the driving characteristic difference judging section judges that the difference is present in the driving characteristic.

With the above-described arrangement, it is possible to judge such a difference between the driving characteristic as to the vehicle driver of the own vehicle and the driving characteristic as to the below-mentioned drive information related to another vehicle, while the above-described drive information covers the vehicle speed information related to the vehicle speed of another vehicle, the acceleration information related to the acceleration thereof, the steering angle information related to the steering angle thereof, the vehicle position information related to the vehicle position thereof, and the vehicle-to-vehicle distance information related to the vehicle-to-vehicle distance thereof. Thus, the unexpected drive of another vehicle can be predicted based upon the drive information of the vehicle, on which both the feature of the drive operation as to the vehicle driver of the own vehicle, and also, the feature of the drive operation as to the vehicle driver of another vehicle may appear.

Also, a first dangerous drive predicting method, according to the present invention, comprising:

a drive information detecting step for detecting drive information which includes at least one of a drive action and vehicle information, the drive action having an operation to a first vehicle by a vehicle driver, and the vehicle information having a condition of the first vehicle in connection with the drive action;

a traffic environment detecting step for detecting a traffic environment around the first vehicle;

a driving characteristic producing step for producing a driving characteristic indicative of a trend of the drive action by the vehicle driver every traffic environment under which the drive action is carried out on the basis of the drive information detected by the drive information detecting step and the traffic environment detected by the traffic environment detecting step;

a driving characteristic storing step for storing the driving characteristic produced by the driving characteristic producing step; and a transmitting step for transmitting the driving characteristic stored in the driving characteristic storing step to a second vehicle.

In accordance with this predicting method, another vehicle can rapidly recognize the future situation of the own vehicle.

Also, a second dangerous drive predicting method, according to the present invention, comprising:

a drive information detecting step for detecting drive information which includes at least one of a drive action and vehicle information, the drive action having an operation to a first vehicle by a vehicle driver, and the vehicle information having a condition of the first vehicle in connection with the drive action;

a traffic environment detecting step for detecting a traffic environment around the first vehicle;

a driving characteristic producing step for producing a driving characteristic indicative of a trend of the drive action by the vehicle driver every traffic environment under which the drive action is carried out on the basis of the drive information detected by the drive information detecting step and the traffic environment detected by the traffic environment detecting step;

a driving characteristic storing step for storing the driving characteristic produced by the driving characteristic producing step;

a driving characteristic receiving step for receiving another vehicle driving characteristic indicative of a driving characteristic of a second vehicle which is transmitted from the second vehicle;

a driving characteristic difference judging step for comparing the another vehicle driving characteristic received by the driving characteristic receiving step with the driving characteristic stored in the driving characteristic storing step so as to judge a difference between the another vehicle characteristic and the stored driving characteristic; and a providing step for providing the difference judged by the driving characteristic difference judging step with respect to the vehicle driver.

In accordance with the above-described predicting method, the driving characteristic as to the vehicle driver of the own vehicle is compared with the driving characteristic as to the vehicle driver of another vehicle under the same traffic environment, and the difference between these driving characteristics can be warned to the driver of the own vehicle, so that an unexpected drive operation of another vehicle can be notified in an earlier stage.

ADVANTAGE OF THE INVENTION

The present invention can provide the dangerous drive predicting apparatus and the dangerous drive predicting method, capable of rapidly recognizing the future situation of the own vehicle by these other vehicles.

BRIEF DESCRIPTION OF THE DRAWINGS

FIG. 13 is a diagram for indicating an example of a driving characteristic related to operation when the vehicle enters a parking lot, which is acquired from the preceding drive vehicle by the dangerous drive predicting apparatus according to the second embodiment of the present invention.

Figure 1:
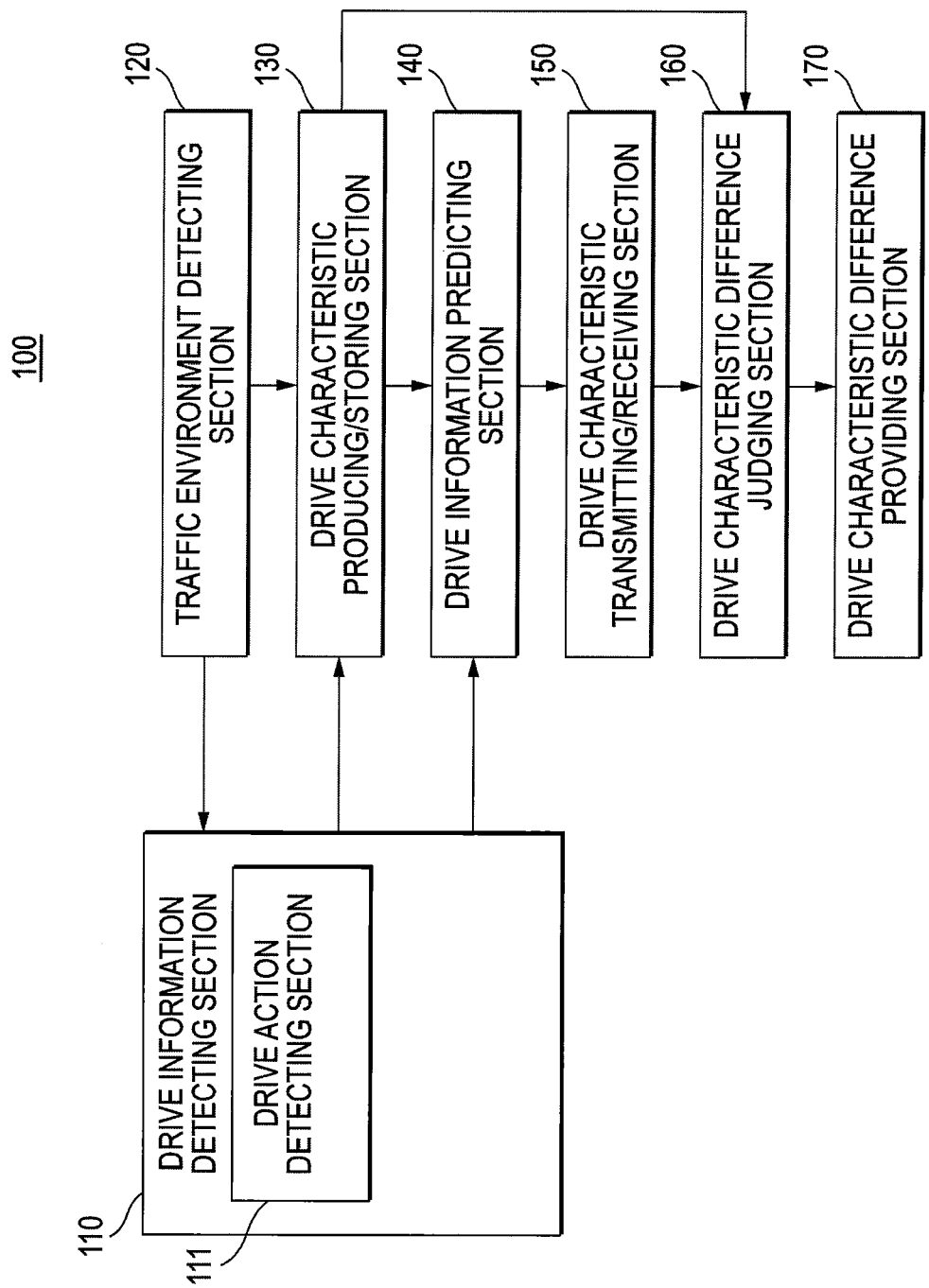
FIG. 1 is a block diagram for showing a dangerous drive predicting apparatus according to a first embodiment of the present invention.

DESCRIPTION OF REFERENCE NUMERALS AND SIGNS 100 dangerous drive predicting apparatus
110 drive information detecting section
111 drive action detecting section
120 traffic environment detecting section
130 driving characteristic producing/storing section
140 drive information predicting section
150 driving characteristic transmitting/receiving section
160 driving characteristic difference judging section
170 driving characteristic difference providing section
600 dangerous drive predicting apparatus
610 drive information detecting section
611 vehicle information detecting section

BEST MODE FOR CARRYING OUT THE INVENTION

Referring now to drawings, embodiments of the present invention will be described.

First Embodiment

FIG. 1 is a block diagram for showing a dangerous drive predicting apparatus 100 according to a first embodiment of the present invention. In FIG. 1, the dangerous drive predicting apparatus 100 is equipped with a drive information detecting section 110, a traffic environment detecting section 120, a driving characteristic producing/storing section 130, a drive information predicting section 140, a driving characteristic transmitting/receiving section 150, a driving characteristic difference judging section 160, and a driving characteristic difference providing section 170. Further, the drive information detecting section 110 has a drive action detecting section 111.

In this case, the drive information detecting section 110 is an example of a drive information detecting unit. Also, the traffic environment detecting section 120 is an example of a traffic environment detecting unit. The driving characteristic producing/storing section 130 corresponds to an example as to a driving characteristic producing unit and a driving characteristic storing unit. Also, the drive information predicting section 140 is an example of a drive condition predicting unit. The driving characteristic transmitting/receiving section 150 corresponds to an example as to a driving characteristic transmitting unit and a driving characteristic receiving unit. Also, the driving characteristic difference judging section 160 is an example of a driving characteristic difference judging unit. Further, the driving characteristic difference providing section 170 is an example of a driving characteristic difference providing unit.

The drive action detecting section 111 detects drive actions, for instance, an accelerator operation, a braking operation, and a winker operation by a vehicle driver, and also, a visual safety confirmation made by the vehicle driver. The drive information corresponds to such an information containing a drive action.

The traffic environment detecting section 120 detects traffic environments as to: peripheral road information related to a road located around a vehicle on which a dangerous drive predicting apparatus has been mounted; signal mechanism information related to a signal mechanism; peripheral vehicle information related to other vehicles which are driven around a vehicle; and parking lot information for indicating whether or not a parking lot is located around the vehicles and the like. The above-described peripheral road information corresponds to information for indicating whether a road along which the vehicle is driven is a single lane, a crossing, or a priority-sided road. The above-described signal mechanism information corresponds to information for indicating whether or not a signal mechanism is present, information for indicating whether or not the vehicle approaches a signal mechanism, and information related to signal light turning situations of the signal mechanism. The above-described peripheral vehicle information corresponds to information for indicating whether or not a preceding drive vehicle is present, information for indicating whether or not a succeeding drive vehicle is present, and information for indicating whether or not an intersecting vehicle is present.

The judgement as to whether or not the vehicle is being driven on the single lane may be made by judging, for instance, information held in a car navigation system to be mounted on the vehicle, or by detecting a lane line by operating a camera to be mounted on the vehicle so as to judge a curved degree of the lane line.

Also, the judgement as to whether or not the vehicle is being driven on the crossing may be made by judging, for instance, information held in a car navigation system to be mounted on the vehicle, or by detecting a signal mechanism, or a stop line by operating the camera to be mounted on the vehicle so as to measure a distance.

Also, the judgement as to whether or not the preceding drive vehicle is present may be made by detecting a vehicle and a lane line by operating the camera to be mounted on the vehicle so as to investigate a driving lane, or by detecting another vehicle as a forward moving obstacle by utilizing a milli-wave radar to be mounted on the vehicle, or by detecting another vehicle by executing a vehicle-to-vehicle communication between a communication appliance to be mounted on the vehicle where the dangerous drive predicting apparatus has been mounted, and another communication appliance to be mounted on the first-mentioned vehicle. The above-described preceding drive vehicle implies any one of the below-mentioned vehicles, namely, a preceding drive vehicle which is being driven on the same lane as the vehicle on which the dangerous drive predicting apparatus has been mounted; and another preceding drive vehicle which is being driven along the same traveling direction as the lane along which the vehicle where the dangerous drive predicting apparatus has been mounted is being driven, and furthermore, another preceding drive vehicle which is being driven on any one adjoining lane of right and left lanes with respect to the traveling direction.

Also, the judgement as to whether or not the succeeding drive vehicle is present may be made by detecting another vehicle by operating the camera to be mounted on the vehicle so as to measure a distance up to the detected vehicle, or by detecting another vehicle as a backward moving obstacle by utilizing a milli-wave radar to be mounted on the vehicle, or by detecting another vehicle by executing a vehicle-to-vehicle communication between a communication appliance to be mounted on the vehicle where the dangerous drive predicting apparatus has been mounted, and another communication appliance to be mounted on the first-mentioned vehicle.

Also, the judgement as to whether or not the intersecting vehicle is present may be made by detecting another vehicle by executing a vehicle-to-vehicle communication between a communication appliance to be mounted on the vehicle, and another communication appliance to be mounted on the first-mentioned vehicle, or by detecting another vehicle by performing a road-to-vehicle communication. In the road-to-vehicle communication, photograph information acquired by photographing other vehicles by operating a fixed point camera of a crossing which is installed at the crossing is transmitted to the vehicle where the dangerous drive predicting apparatus has been mounted.

Also, the judgement as to whether or not the parking lot is present may be made based upon information held in a car navigation system to be mounted on the vehicle, or by detecting a so-called "coin parking" (namely, parking lot which is rented based upon time charge), or a signboard of a shop by operating a camera to be mounted on the vehicle.

Also, the judgement as to whether or not the signal mechanism is approached may be made based upon information held in a car navigation system to be mounted on the vehicle, or by detecting the signal mechanism by operating the camera to be mounted on the vehicle so as to measure a distance up to the detected signal mechanism.

Also, the judgement as to whether or not the signal light turning situation (which has information for indicating whether or not transition of signal light turning operations occurs) of the signal mechanism may be made by that the vehicle acquires signal light turning information installed on the signal mechanism by performing a road-to-vehicle communication between the signal mechanism and the vehicle on which the dangerous drive predicting apparatus has been mounted so as to judge the signal light turning situation based upon the signal light turning information, or by detecting the signal mechanism by operating a camera to be mounted on the vehicle so as to identify the signal light turning situation of this detected signal mechanism.

Further, the judgement as to whether or not the vehicle is being driven on the priority-sided road (namely, such a road that stop line is not present at crossing, or another road where signal mechanism turns yellow in flickering mode) may be made by judging information held in a car navigation system to be mounted on the vehicle, or by detecting a lane line by operating a camera to be mounted on the vehicle, or by detecting the signal mechanism by operating the camera to be mounted on the vehicle so as to measure a distance up to the detected signal mechanism, and furthermore, so as to identify a signal light turning situation of this signal mechanism.

The driving characteristic producing/storing section 130 produces a driving characteristic with respect to each of vehicle drivers and a driving characteristic with respect to each of traffic environments based upon the drive information detected by the drive information detecting section 110 and the traffic environments detected by the traffic environment detecting section 120. As a method of identifying a vehicle driver, information about a vehicle driver may be inputted in a manual manner. Alternatively, while an apparatus such as a pupil authenticating apparatus capable of discriminating a person may be installed within a vehicle, a vehicle driver may be identified based upon information detected by this installed apparatus.

The drive information predicting section 140 inputs the below-mentioned driving characteristic, present drive information detected by the drive information detecting section 110, and a traffic environment detected by the traffic environment detecting section 120 into the driving characteristic producing/storing section 130 so as to predict such a drive condition indicative of future drive information. The above-described driving characteristic has been featured based upon a vehicle action of the same vehicle driver, which was detected in the past by the drive information detecting section 110. The driving characteristic transmitting/receiving section 150 transmits the driving characteristic predicted by the own vehicle to another vehicle, and receives a driving characteristic of another vehicle from this vehicle.

The driving characteristic difference judging section 160 compares the driving characteristic as to another vehicle, which is acquired from this another vehicle, with the driving characteristic of the own vehicle, which has been stored in the driving characteristic storage section 130, so as to judge a difference between the above-described driving characteristics. The driving characteristic difference providing section 170 presents a driving characteristic of another vehicle to the vehicle driver, which is different from the driving characteristic of the own vehicle judged by the driving characteristic difference judging section 160.

It should be noted that in the present first embodiment, the driving characteristic stored in the driving characteristic producing/storing section 130 has been employed in the drive information predicting section 140. Alternatively, the driving characteristic may be predicted by the drive information predicting section 140 based upon a drive route up to a destination place, which is produced by the car navigation system mounted on the vehicle.

Figure 2:
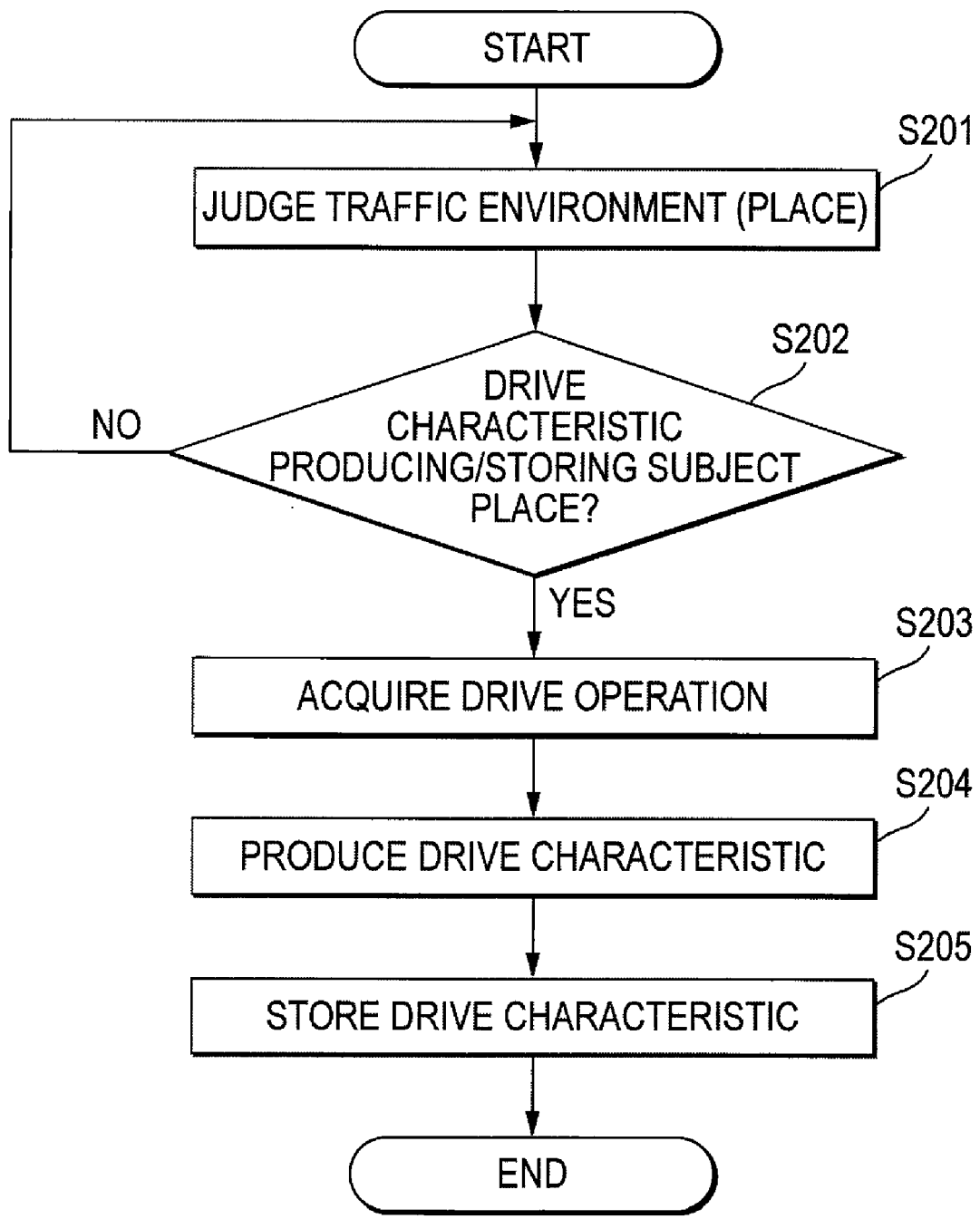
FIG. 2 is an operation flow chart for describing driving characteristic producing and storing operations by the dangerous drive predicting apparatus according to the first embodiment of the present invention.

Next, a description is made of operations when the dangerous drive predicting apparatus 100 produces and stores a driving characteristic. FIG. 2 is an operation flow diagram for describing operations when the dangerous drive predicting apparatus 100 according to the first embodiment of the present invention produces and stores the driving characteristics.

Firstly, the traffic environment detecting section 120 detects peripheral road information, signal mechanism information, peripheral vehicle information, and parking lot information (step S201). The driving characteristic producing/storing section 130 judges a traffic environment based upon the detected information, namely judges whether or not the traffic environment corresponds to such a traffic environment to which a previously determined driving characteristic producing/storing operation should be carried out (step S202).

In this case, as to such a traffic environment to which a driving characteristic producing/storing operation should be carried out, the below-mentioned traffic environment is supposed, namely, traffic environments where there are many traffic accidents among vehicles (namely, places where large number of traffic jams occur and large number of rear-end collision accidents occur). As apparent from the foregoing description, there is no problem even when there are plural pieces of traffic environments to which driving characteristic producing/storing operations should be carried out. As a method for recognizing a traffic environment, the below-mentioned method may be conceived; That is, a pattern matching process is performed from an image photographed by a camera mounted on a vehicle so as to recognize traffic environments. Also, a traffic environment may be alternatively recognized based upon the road information stored in a car navigation system. Moreover, the traffic environment detecting section 120 may alternatively detect various sorts of traffic environments in accordance with the above-described method.

If the driving characteristic producing/storing section 130 judges in the step S202 that the traffic environment is such a traffic environment to which the driving characteristic producing/storing operation should be carried out, then the drive information detecting section 110 starts to acquire drive information, and continuously performs the drive information acquisition until passing through such a traffic environment to which a danger judgement should be carried out (step S203). The acquisition of the drive information may be carried out until the vehicle is driven from, for instance, a place located in front of a crossing by 100 m (meters) until the vehicle passes through another place located behind the crossing by 50 m. After the acquisition of the drive information is accomplished, the driving characteristics under the relevant traffic environment, which have been stored in the driving characteristic producing/storing section 130, are updated based upon the acquired drive information so as to produce a driving characteristic (step S204). It should also be noted that while the past driving characteristic may be stored as a history, the drive information producing/storing section 130 may alternatively refer to the stored past history later. This driving characteristic represents such a trend of drive actions by a vehicle driver by statistically processing usual drive information of the vehicle driver.

Figure 3:
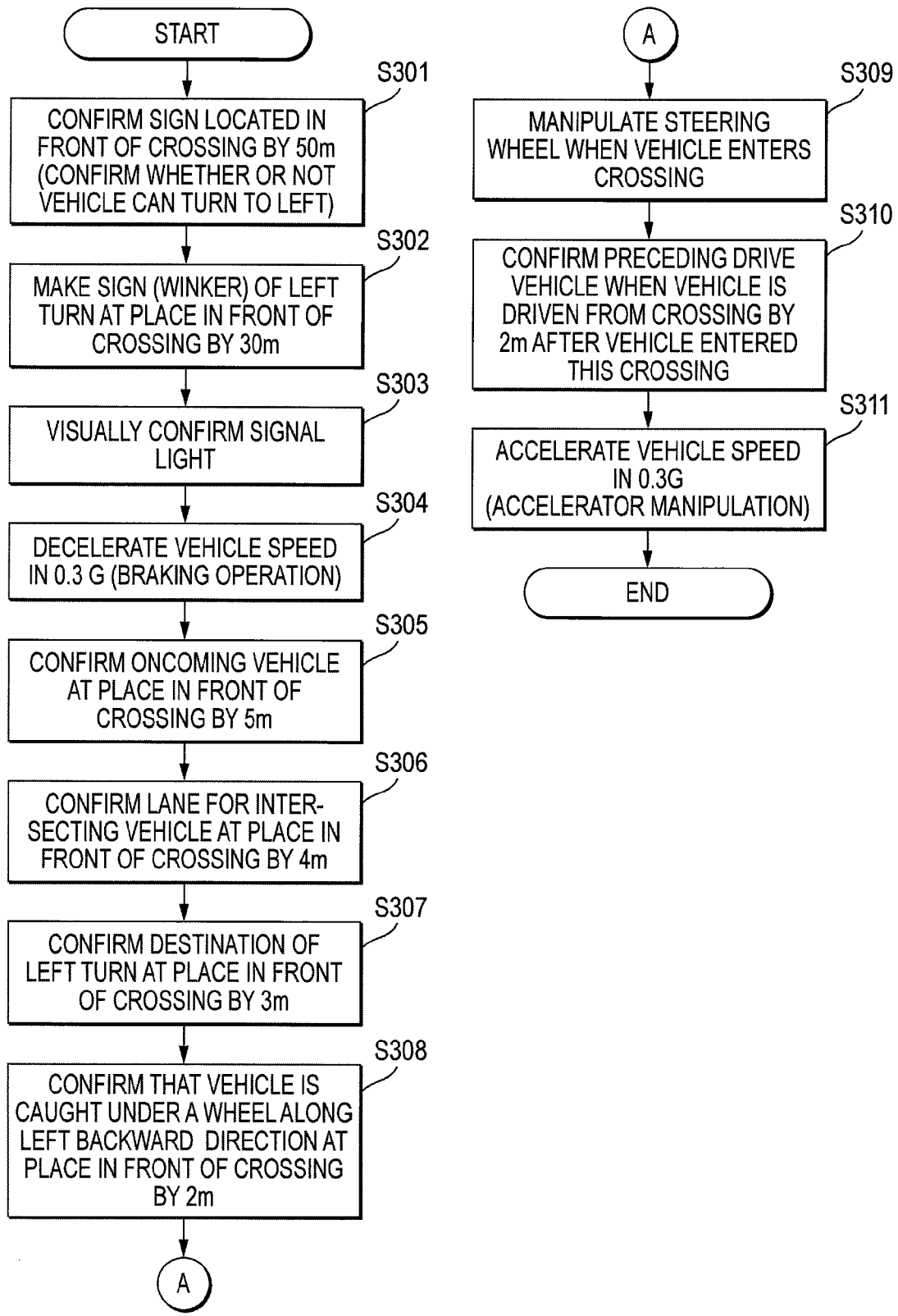
FIG. 3 is a diagram for indicating a driving characteristic example as to the dangerous drive predicting apparatus according to the first embodiment of the present invention when the own vehicle turns to the left at a crossing.

Now, as one example as to the driving characteristic of the traffic environment to which the driving characteristic producing/storing operation must be carried out, an example of such a driving characteristic when the vehicle turns to the left at the crossing is exemplified. FIG. 3 is a diagram for representing an example as to a driving characteristic of a dangerous drive predicting apparatus 700 according to the first embodiment of the present invention when the vehicle turns to the left at the crossing.

Firstly, the vehicle driver visually recognizes a sign of a crossing at a place located in front of the crossing by 50 m before the vehicle enters the crossing (step S301). Next, the vehicle driver operates the winker so as to turn to the left at a place located in front of the crossing by 30 m (step S302), and visually confirms a signal light turning situation of a signal mechanism (step S303), and performs a braking operation in order to decelerate the vehicle speed by 0.3 G (step S304).

When the vehicle approaches a place located in front of the crossing by 5 m, the vehicle driver visually confirms whether or not an oncoming vehicle is present which tries to turn to the right (step S305), and visually confirms a safe of an intersected lane at a place located in front of the crossing by 4 m (step S306). When the vehicle approaches a place located in front of the crossing by 3 m, the vehicle driver visually confirms a safe about a pedestrian crossing of the left turned destination (step S307), and when the vehicle approaches a place located in front of the crossing by 2 m, the vehicle driver visually confirms whether or not a motorcycle driven in a left backward direction is caught under a wheel (step S308). When the vehicle enters the crossing, the vehicle driver manipulate a steering wheel to the left direction (step S309), and when the vehicle is driven over 2 m after the vehicle has entered the intersected lane, the vehicle driver confirms whether or not a preceding drive vehicle is present (step S310). Thereafter, the vehicle driver manipulates the accelerator so as to gradually accelerate the vehicle speed by 0.3 G (step S311).

Updating of the driving characteristic may be conceived as follows: That is, for example, in such a case that the driving characteristic has been defined in such a manner that the left turning sign by operating the winker has been made at the place located in front of the crossing by 32 m (step S302), if newly acquired drive information implies a left turning sign made at a place located in front of the crossing by 28 m, then the distances are averaged, so that the left turning sign is made at a place located in front of the crossing by 30 m.

The driving characteristic which has been formed in the above-described manner is updated as a new value which is stored in the driving characteristic producing/storing section 130 (step S205).

As one example as to the driving characteristic of the traffic environment to which the driving characteristic producing/storing operation must be carried out, the driving characteristics acquired when the vehicle turns to the left at the crossing have been exemplified in the above-explained embodiment. Alternatively, driving characteristics under traffic environments other than the above-described traffic environment may be produced and stored.

For instance, winker instruction situations acquired for a predetermined time just before a vehicle changes a lane may be acquired as drive information to which the driving characteristic producing/storing operation must be carried out.

Figure 4:
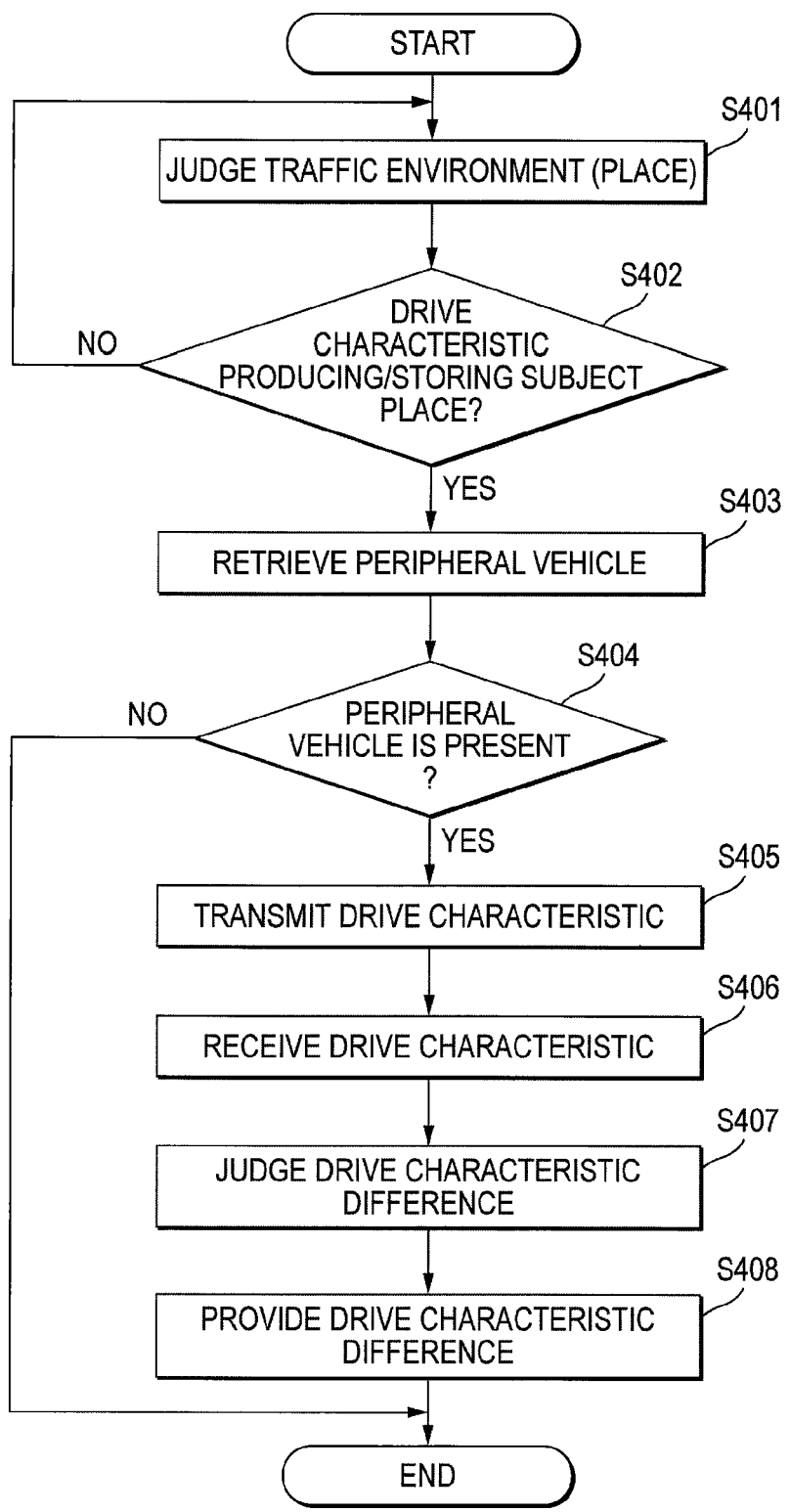
FIG. 4 is an operation flow diagram for explaining operations when a driving characteristic of the dangerous drive predicting apparatus is transmitted and received in the first embodiment of the present invention.

Next, a description is made of transmitting and receiving operations as to a driving characteristic, and a providing operation for providing a difference in driving characteristics by the dangerous drive predicting apparatus 100. FIG. 4 is an operation flow chart for explaining operations when the dangerous drive predicting apparatus 100 according to the first embodiment of the present invention transmits a driving characteristic.

Firstly, the traffic environment detecting section 120 detects a shape of a road around the own vehicle, into which the own vehicle tries to enter; a condition whether or not a signal mechanism is present; a signal light turning situation; a condition whether or not a preceding drive vehicle is present; and the like (step S401). The driving characteristic producing/storing section 130 judges a traffic environment based upon the detected information, namely judges whether or not the traffic environment corresponds to such a previously determined traffic environment to which the driving characteristic producing/storing operation should be carried out (step S402).

When the driving characteristic producing/storing section 13 judges that the present traffic environment corresponds to the traffic environment to which the driving characteristic producing/storing operation should be carried out, the traffic environment detecting section 120 retrieves another vehicle which is located around the own vehicle (step S403). In order to retrieve another vehicle, such a detecting operation with employment of a sensing appliance such as a camera and a radar may be carried out. Also, it is conceivable to employ a method for exchanging positional information by employing communication section.

Figure 9:
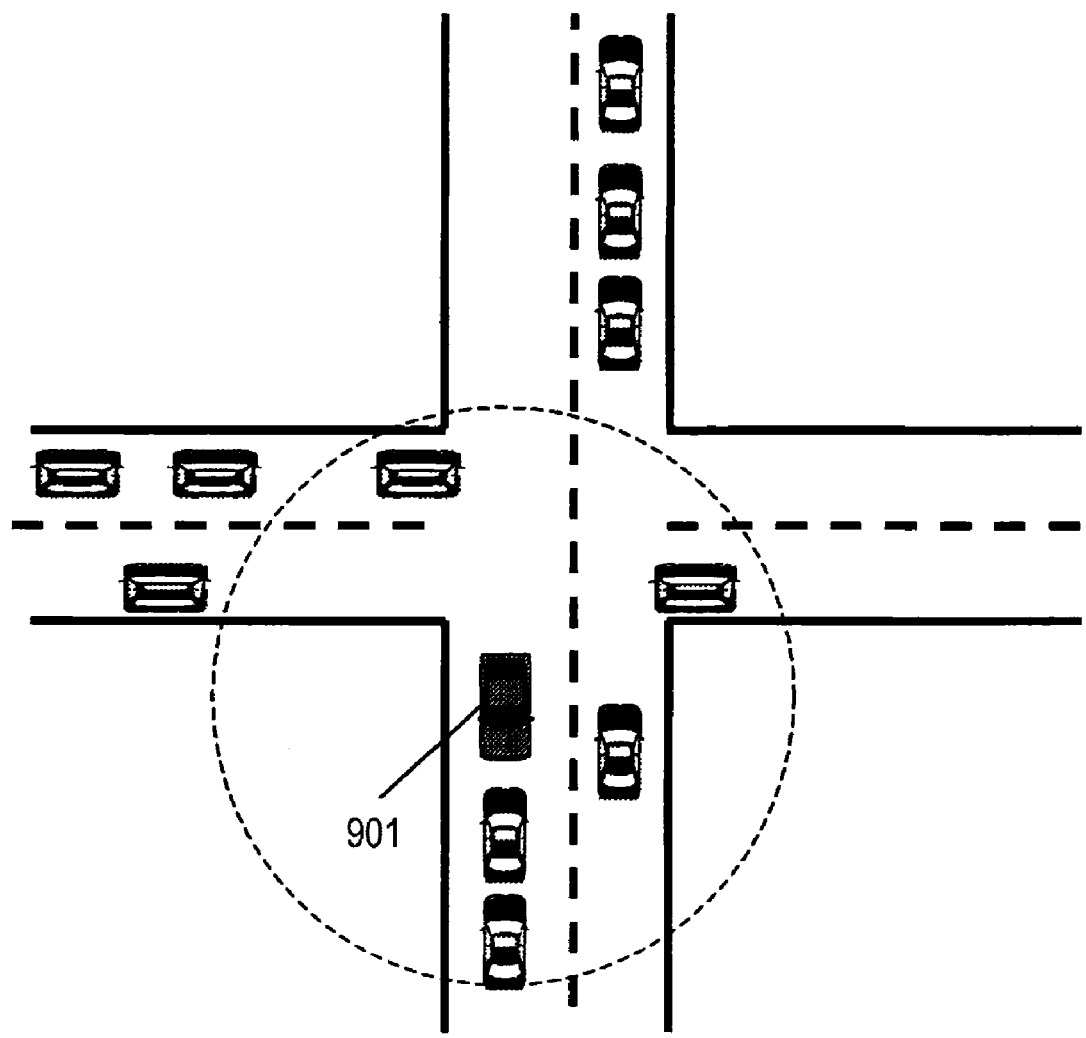
FIG. 9 is a first schematic diagram for showing a range of peripheral vehicles in the first embodiment of the present invention.
Figure 10:
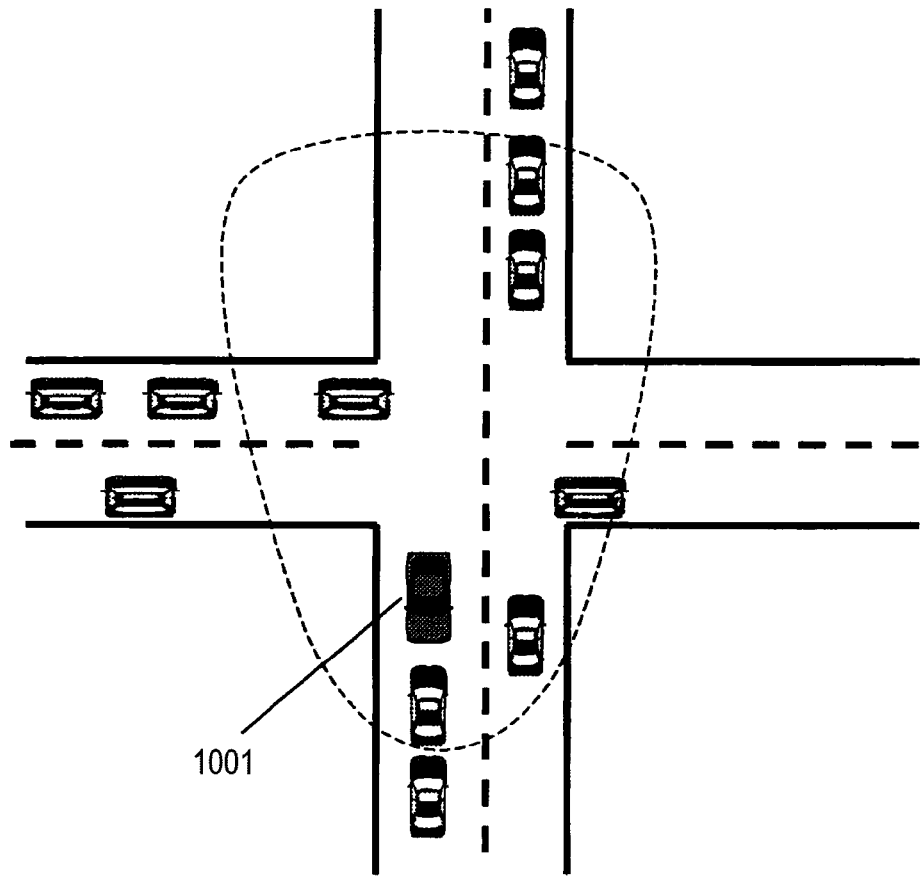
FIG. 10 is a second schematic diagram for showing a range of peripheral vehicles in the first embodiment of the present invention.

In this case, a description is made of ranges of peripheral vehicles to which driving characteristics are transmitted and received. FIG. 9 is a first schematic diagram for showing a range of peripheral vehicles in the first embodiment of the present invention. In FIG. 9, while the own vehicle 901 is located at a center, vehicles which are present within a circle having a predetermined radius are defined as the above-described peripheral vehicles. FIG. 10 is a second schematic diagram for showing a range of peripheral vehicles in the first embodiment of the present invention. In FIG. 10, while the own vehicle 1001 is located at a center, such an area within a predetermined region having a substantially triangular shape is determined as an area which may become a danger, and vehicles which are present inside this dangerous area are defined as the peripheral vehicles. It should be noted that the areas shown in FIG. 9 and FIG. 10 constitute one example where the ranges for the peripheral vehicles are determined, and therefore, other ranges may be alternatively employed.

After the presence of these peripheral vehicles is confirmed (step S404), the driving characteristic transmitting/receiving section 150 transmits a driving characteristic related to such a traffic environment that the own vehicle tries to enter the area with respect to the peripheral vehicles (step S405).

Alternatively, only in such a case that the driving characteristic of the own vehicle is different from an ideal driving characteristic (for instance, ideal brake timing etc.) which has been previously determined, the driving characteristic of the own vehicle may be transmitted to the peripheral vehicles. As a result, the minimum necessary information as to the own vehicle may be transferred to the peripheral vehicles.

Also, when the driving characteristic is received from the peripheral vehicle by the driving characteristic transmitting/receiving section 150 (step S460), the driving characteristic difference judging section 160 judges such a difference between the driving characteristic of the own vehicle stored in the driving characteristic producing/storing section 130 and the acquired driving characteristic of the peripheral vehicle (step S407), and if the driving characteristic difference judging section 160 judges the difference as to the driving characteristic of the peripheral vehicle, then the driving characteristic difference providing section 170 presents an unexpected drive of the peripheral vehicle with respect to the vehicle driver based upon the difference in the driving characteristics (step S408).

As a method for judging the difference between the driving characteristics, for instance, in such a case that the driving characteristic of the peripheral vehicles corresponds to such a driving characteristic (will be discussed later) shown in FIG. 5 and the driving characteristic of the own vehicle corresponds to the driving characteristic indicated in FIG. 3, a detection is made of operation timing, and a lack of operations.

Alternatively, while the driving characteristic of the peripheral vehicles may be directly presented, a feature of drives of other vehicles may be notified to the vehicle driver of the own vehicle in order to call this vehicle driver's attention to the peripheral vehicles. Also, the received driving characteristic of the peripheral vehicles may be compared with the previously defined ideal driving characteristic (for instance, ideal brake timing etc.) so as to judge whether or not the vehicle drivers of other vehicles perform dangerous drives, and then, the judgement result may be presented to the vehicle driver of the own vehicle. It is so assumed that the above-described driving characteristic producing/storing operation, the driving characteristic transmitting/receiving operation, and the driving characteristic difference providing operation are carried out in a parallel manner every time predetermined timing elapses.

Figure 5:
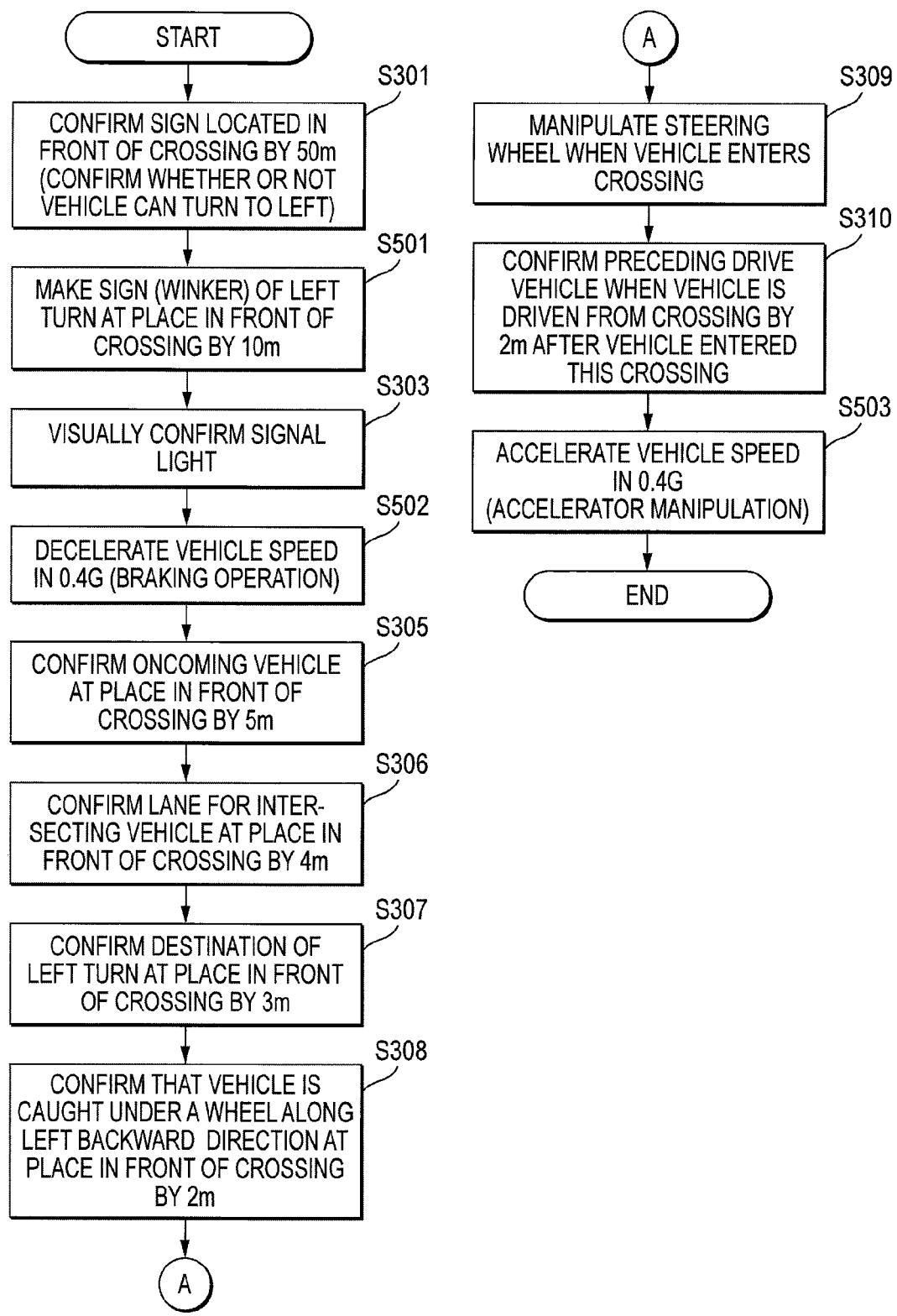
FIG. 5 is a diagram for representing an example as to a driving characteristic when another vehicle turns to the left at the crossing, which is acquired from another vehicle by the dangerous drive predicting apparatus according to the first embodiment of the present invention.

In this case, FIG. 5 is a diagram for representing an example as to a driving characteristic when another vehicle turns to the left at the crossing, which is acquired from another vehicle by the dangerous drive predicting apparatus 100 according to the first embodiment of the present invention. Although the driving characteristic example of FIG. 5 is substantially identical to the driving characteristic example of the dangerous drive predicting apparatus 100 shown in FIG. 3 when the own vehicle turns to the left at the crossing, process steps thereof corresponding to the above-described steps S302, S304, and S311 are different from each other.

Concretely speaking, in the above-described step S302, the own vehicle made the left turning sign at the place located in front of the crossing by 30 m, whereas in a step S501, another vehicle makes a left turning sign at a place located in front of a crossing by 10 m. Also, in the above-described step S304, the own vehicle was decelerated in 0.3 G, whereas in a step S302, another vehicle is decelerated in 0.4 G. Further, in the above-described step S311, the own vehicle was accelerated in 0.3 G, whereas in a step S503, another vehicle is accelerated in 0.4 G.

From FIG. 5, the following trend may be understood. That is, for instance, as can be understood from the step S302 and the step S501, winker manipulation timing by a vehicle driver of a peripheral vehicle is slower, as compared with that of the vehicle driver of the own vehicle. Also, the following trend may be understood. That is, as can be understood from the step S304 and the step S502, the vehicle driver of the peripheral vehicle rapidly executes the braking operation, as compared with that of the vehicle driver of the own vehicle. Moreover, the following trend may be understood. That is, as can be understood from the step S311 and the step S503, the vehicle driver of the peripheral vehicle rapidly starts this peripheral vehicle, as compared with that of the vehicle driver of the own vehicle.

It should also be understood that the driving characteristic example acquired from another vehicle when another vehicle turns to the left at the crossing as indicated in FIG. 5 may merely correspond to one example as to the driving characteristics acquired from other vehicles. Thus, while other characteristics are acquired as the driving characteristics, various sorts of information may be alternatively presented with respect to the vehicle driver of the own vehicle.

For instance, it is possible to acquire a driving characteristic example related to a winker instruction when a preceding drive vehicle changes a drive lane. In this case, the above-described preceding drive vehicle implies any one of the below-mentioned vehicles, namely, a preceding drive vehicle which is being driven on the same lane as the own vehicle; and another preceding drive vehicle which is being driven in the same traveling direction as the lane along which the vehicle where the dangerous drive predicting apparatus has been mounted is being driven, and furthermore, another preceding drive vehicle which is being driven on any one adjoining lane of right and left lanes with respect to the traveling direction. In such a case that as a traffic environment where the own vehicle is positioned, the own vehicle is being traveled on a single lane and further a preceding drive vehicle is present, the driving characteristic transmitting/receiving section 150 receives a driving characteristic from the preceding drive vehicle based upon winker instruction situations for a predetermined time just before the own vehicle changes a lane, and the driving characteristic difference judging section 160 judges a difference between the received driving characteristic and the driving characteristic of the own vehicle. The receiving operation of this driving characteristic is carried out only 1 time, for instance, when the preceding drive vehicles are replaced with each other. When the driving characteristic difference judging section 160 judges the below-mentioned trends, for instance, the driving characteristic difference presenting section 170 may present these trends with respect to the vehicle driver of the own vehicle: there is such a trend that a preceding drive vehicle changes a drive lane without making a winker instruction, or there is another trend that when a driving characteristic of the own vehicle is compared with a driving characteristic of a preceding drive vehicle, the preceding drive vehicle makes a winker instruction later than a winker instruction made by the own vehicle.

Figure 11:
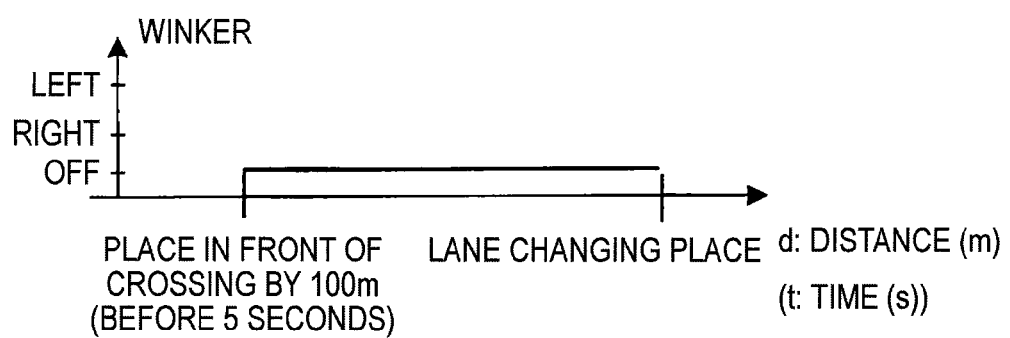
FIG. 11 is a diagram for showing an example of a driving characteristic related to a winker instruction when the vehicle changes a lane, which is acquired from a preceding drive vehicle by the dangerous drive predicting apparatus according to the first embodiment of the present invention.

FIG. 11 shows one example as to a driving characteristic made based upon winker instruction situations for a predetermined time just before a preceding drive vehicle changes a drive lane, which are acquired from the preceding drive vehicle by the own vehicle. FIG. 11 shows such a trend that the preceding drive vehicle changes the drive lane at a place located in front of a lane changing point by 100 m, or before 5 seconds when the preceding drive vehicle changes the drive lane without completely making the winker instruction. Since this driving characteristic is compared with a previously defined ideal driving characteristic (for example, when preceding drive vehicle changes drive lane, vehicle driver thereof must make winker instruction), the driving characteristic difference providing section 170 can present such a possibility that the preceding drive vehicle changes the drive lane without completely making the winker instruction. Since the vehicle driver of the own vehicle acquires such a driving characteristic from another vehicle, this vehicle driver can drive the own vehicle in a safer manner.

In accordance with such a dangerous drive predicting apparatus 100 described in the first embodiment of the present invention, the dangerous drive predicting apparatus 100 is arranged by employing the below-mentioned section, so that other vehicles can quickly recognize future situations of the own vehicle. That is, the above-described dangerous drive predicting apparatus 100 is arranged by: the drive information detecting section 110 for detecting drive information containing drive actions which cover operation for a first vehicle by a vehicle driver; the traffic environment detecting section 120 for detecting a traffic environment around the first vehicle; the driving characteristic producing/storing section 130 for producing a driving characteristic indicative of a trend of operation actions by the vehicle drivers every vehicle driver who executes the drive action and every traffic environment under which the drive action is carried out based upon both the drive information detected by the drive information detecting section 110 and the traffic environment detected by the traffic environment detecting section 120, and for storing thereinto the produced driving characteristic; and also, a driving characteristic transmitting unit for transmitting the driving characteristic stored in the driving characteristic producing/storing section 130 to a second vehicle.

Second Embodiment

Referring now to drawings, a description is made of a second embodiment of the present invention.

Figure 6:
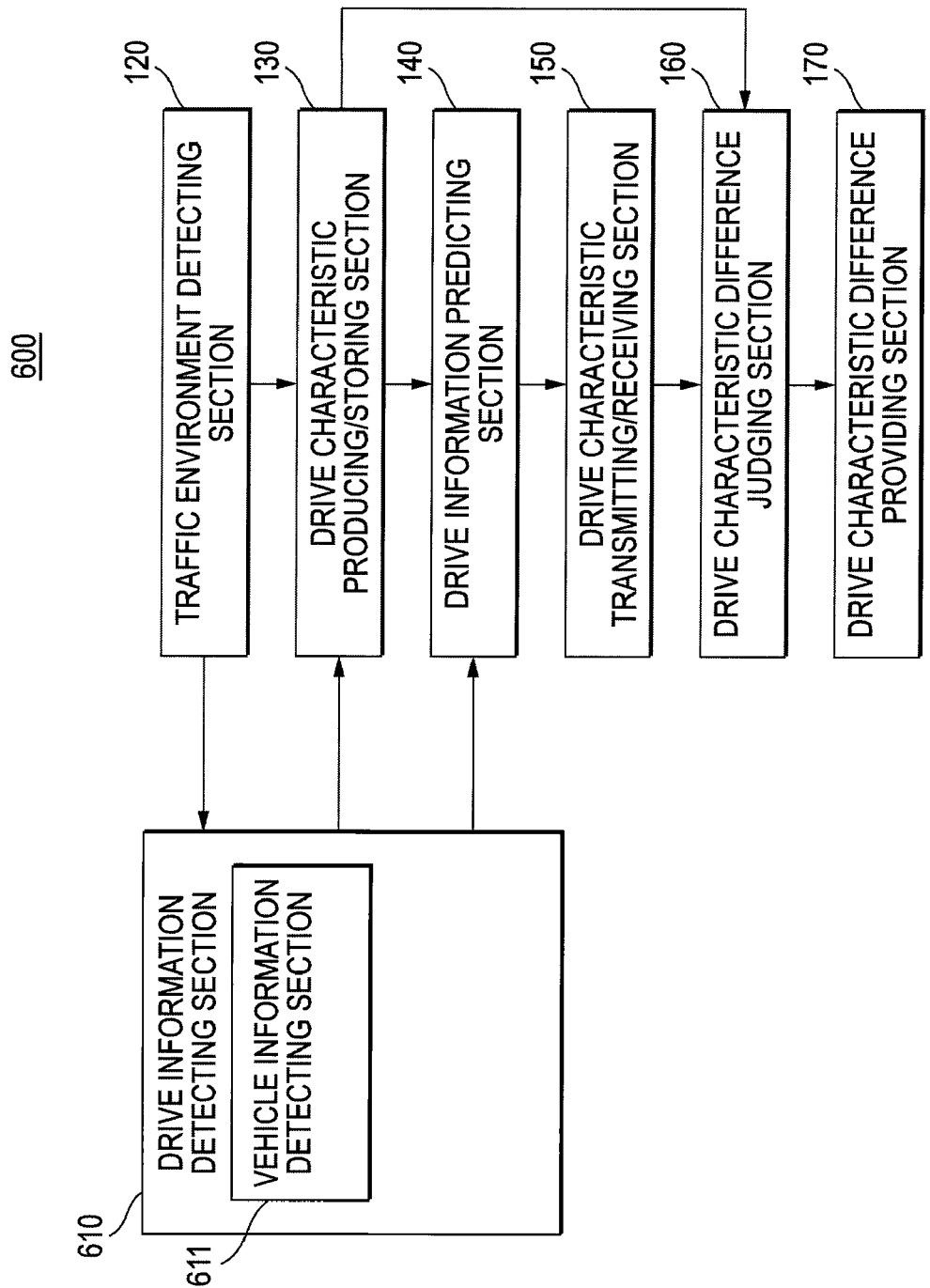
FIG. 6 is a block diagram for showing a dangerous drive predicting apparatus according to a second embodiment of the present invention.

A dangerous drive predicting apparatus 600 according to the second embodiment of the present invention is equipped with drive information detecting section 610, instead of the above-described drive information detecting section 110 of the dangerous drive predicting apparatus 100 according to the first embodiment of the present invention. In FIG. 6, the same reference numerals shown in the dangerous drive predicting apparatus 100 of the first embodiment will be employed as those for denoting the same structural portions of the dangerous drive predicting apparatus 600 described in the second embodiment of the present invention, and therefore, explanations thereof will be omitted.

The drive information detecting section 610 has a vehicle information detecting section 611. The vehicle information detecting section 611 detects vehicle information such as vehicle speed information, acceleration information, steering angle information, vehicle position information, and vehicle-to-vehicle distance information, which appear as a result obtained when an accelerator, a brake pedal, and a steering wheel, which are manipulated by a vehicle driver, control a vehicle. The vehicle speed information is related to a speed of the vehicle; the acceleration information is related to acceleration of the vehicle; the steering angle information is related to a steering angle thereof; the vehicle position information is related to a position of the vehicle, and the vehicle-to-vehicle distance information is related to a vehicle-to-vehicle distance. The drive information is such an information containing vehicle information.

Next, a description is made of operations when the dangerous drive predicting apparatus 600 produces and stores driving characteristics. Basically, the above-described producing/storing operations of the driving characteristics by this dangerous drive predicting apparatus 600 are similar to those of the driving characteristics by the first dangerous drive predicting apparatus 100 shown in FIG. 2. However, the drive information acquired in the step S203 and the driving characteristic produced in the step S204 are different from those of the second dangerous drive predicting apparatus 600.

When the drive information is acquired by the dangerous drive predicting apparatus 600, a vehicle speed, acceleration, a steering angle, a vehicle position, and the like are acquired, which appear as a result obtained when the accelerator, the brake pedal, and the steering handle, which are manipulated by the vehicle driver, control the vehicle. When the driving characteristic is produced by the dangerous drive predicting apparatus 600, for example, as shown in FIG. 7, both a temporal change of speeds and a temporal change of the steering angles are produced in response to distances measured from such a place where the acquisition of the vehicle information is commenced.

Figure 7A:
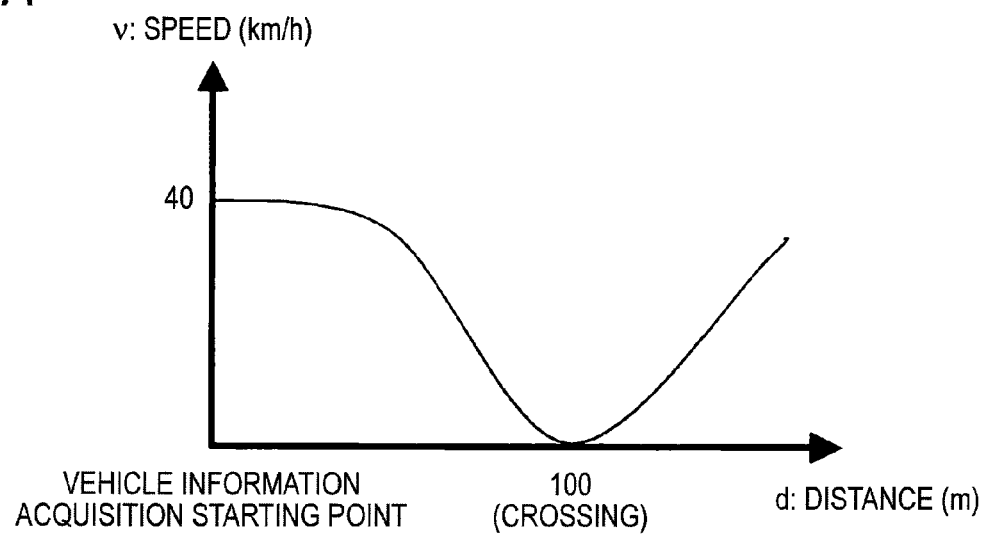
FIG. 7 is a diagram for representing an example of a driving characteristic related to a speed and a steering angle when a vehicle turns to the left at the crossing with respect to the dangerous drive predicting apparatus according to the second embodiment of the present invention.
Figure 7B:
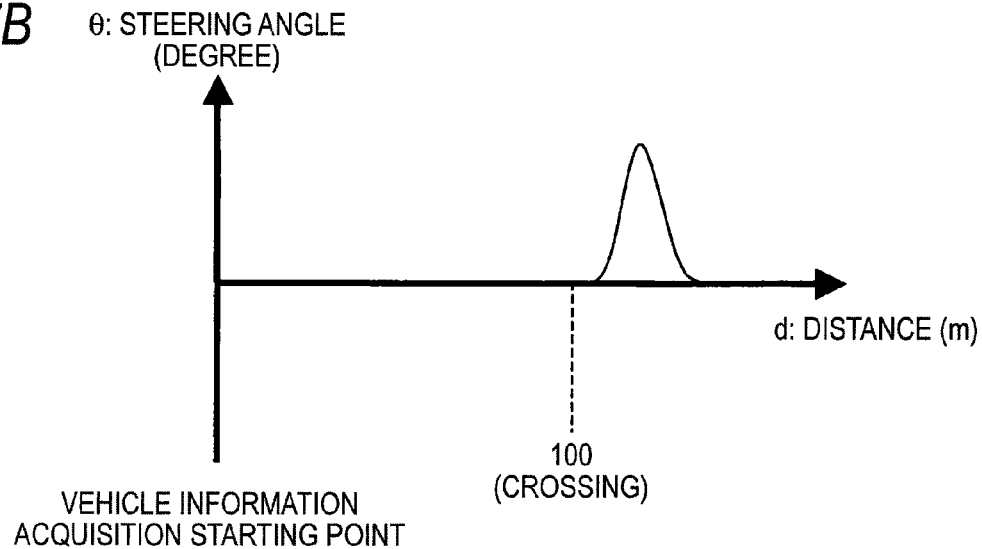

In this case, FIG. 7(*a*) is a diagram for showing a driving characteristic related to a speed when a vehicle turns to the left at a crossing as to the dangerous drive predicting apparatus 600 according to the second embodiment of the present invention. FIG. 7(*a*) represents a change in speeds with respect to distances in such a case that the vehicle under driven at a speed of 40 Km/hour at a vehicle information acquisition starting place turns to the left at a place separated from the vehicle information acquisition starting place by 100 m. FIG. 7(*b*) is a diagram for showing a driving characteristic related to a steering angle when the vehicle turns to the left at the crossing as to the dangerous drive predicting apparatus 600 according to the second embodiment of the present invention, FIG. 7(*b*) represents a change in steering angles with respect to distances in such a case that the vehicle turns to the left at a place separated from the vehicle information acquisition starting place by 100 m.

In the above-described second embodiment, as one example for the driving characteristic of the traffic environment to which the driving characteristic producing/storing operations should be carried out the driving characteristics related to the speeds and the steering angles when the vehicle turns to the left at the crossing have been exemplified. Alternatively, driving characteristics under traffic environments other than the above-described traffic environment may be produced and stored.

For instance, both a deceleration degree when the vehicle is driven under normal drive condition and a degree distribution of times when the speed of the vehicle is reduced at this deceleration degree are acquired as drive information, and then, a driving characteristic may be produced and stored based upon the acquired drive information. Under the above-described normal drive condition, for instance, the vehicle is traveled in a substantially constant velocity for 10 seconds, or more.

Also, speeds every distance measured up to a parking lot, winker instruction situations, and a change in steering angles may be alternatively acquired as drive information, and then, the driving characteristic producing/storing operation may be alternatively carried out with respect to the acquired drive information. It should be understood that the winker instruction situations are acquired based upon winker manipulations which are detected by the drive action detecting section 111 employed in the first embodiment, although the above-described drive action detecting section 111 is not shown in the second embodiment.

Also, signal light turning situations of signal mechanisms every distance measured up to the signal mechanisms, and a change in vehicle speeds may be alternatively acquired as drive information, and then, the driving characteristic producing/storing operation may be alternatively carried out with respect to the acquired drive information.

Also, a break-in space (namely, vehicle-to-vehicle distance) of an adjoining lane, and a degree distribution about a total lane changing time within the break-in space may be alternatively acquired as drive information, and then, the driving characteristic producing/storing operation may be alternatively carried out with respect to the acquired drive information.

Also, signal light turning situations of signal mechanisms every distance measured up to a stopping line (temporary stopping line), and a change in vehicle speeds may be alternatively acquired as drive information, and then, the driving characteristic producing/storing operation may be alternatively carried out with respect to the acquired drive information.

Also, an averaged speed when the own vehicle is driven under normal drive condition, and a degree distribution about a total time while the own vehicle has been driven in this averaged speed may be alternatively acquired as drive information, and then, the driving characteristic producing/storing operation may be alternatively carried out with respect to the acquired drive information.

Further, an averaged speed when the own vehicle is driven under normal drive condition, a degree distribution about a total time while the own vehicle has been driven at this averaged speed under the normal drive condition, a vehicle-to-vehicle distance with respect to a preceding drive vehicle, and also, a degree distribution about a total time while the own vehicle has been driven with keeping this vehicle-to-vehicle distance may be alternatively acquired as drive information, and then, the driving characteristic producing/storing operation may be alternatively carried out with respect to the acquired drive information.

Next, a description is made of operations when a driving characteristic transmitting and receiving operation is carried out in the dangerous drive predicting apparatus 600 according to the second embodiment of the present invention. The driving characteristic transmitting/receiving operation of the second dangerous drive predicting apparatus 600 is basically similar to the driving characteristic transmitting/receiving operation by the first dangerous drive predicting apparatus 100 of the present invention shown in FIG. 1. However, the methods for judging the driving characteristic difference defined in the step S407 are different between the dangerous drive predicting apparatuses 100 and 600.

Figure 8A:
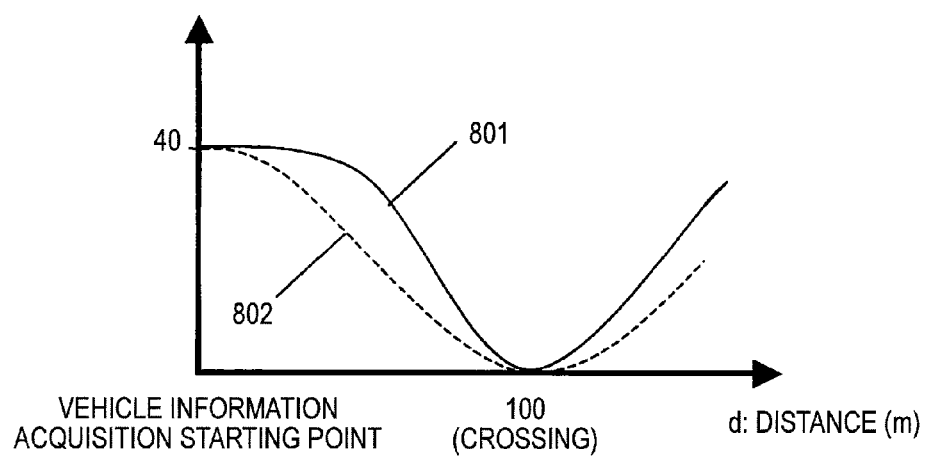
FIG. 8 is a diagram for indicating a difference judging example for driving characteristics related to speeds and steering angles of the own vehicle and another vehicle when the own vehicle turns to the left at the crossing with respect to the dangerous drive predicting apparatus according to the second embodiment of the present invention.
Figure 8B:
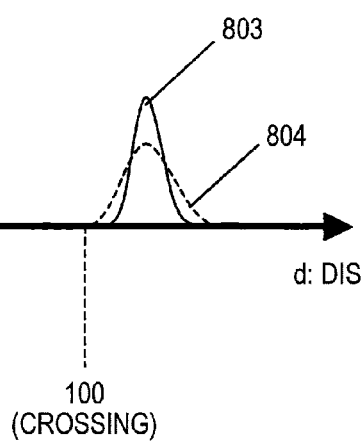

In the driving characteristic difference judging operation by the dangerous drive predicting apparatus 600, as represented in FIG. 8, a judgement is made of differences in driving characteristics such as changes in vehicle speeds and changes in steering angles under the same traffic environments. In this case, FIG. 8(*a*) is a diagram for showing a driving characteristic difference judging example related to speeds as to the own vehicle and another vehicle when both the own vehicle and another vehicle turn to the left at a crossing in the second embodiment of the present invention. A solid line 801 indicates a driving characteristic (namely, change in vehicle speeds) of another vehicle, and a broken line 802 shows a driving characteristic (namely, change in vehicle speeds) of the own vehicle. In such a case that both the own vehicle and another vehicle are driven at a speed of 40 Km/h on a vehicle information acquisition starting place, if a comparison is made between speed changes of the own vehicle and another vehicle with respect to such a distance when both the vehicles turn to the left at a place separated from the vehicle information acquisition starting place by 100 m, then the below-mentioned trends may be revealed. That is, since the solid line 801 represents a rapid temporal change, as compared with a temporal change indicated by the broken line 802, the vehicle driver of another vehicle performs a rapid braking operation and a rapid starting operation, as compared with those of the vehicle driver of the own vehicle.

Also, FIG. 8(*b*) is a diagram for showing a driving characteristic difference judging example related to steering angles as to the own vehicle and another vehicle when both the own vehicle and another vehicle turn to the left at a crossing in the second embodiment of the present invention. A solid line 803 indicates a driving characteristic (namely, change in steering angles) of another vehicle, and a broken line 804 shows a driving characteristic (namely, change in steering angles) of the own vehicle. If a comparison is made between steering angle changes of the own vehicle and another vehicle with respect to such a distance when both the vehicles turn to the left at a place separated from the vehicle information acquisition starting place by 100 m, then the below-mentioned trends may be revealed. That is, since the solid line 903 represents a rapid temporal change, as compared with a temporal change indicated by the broken line 904, the vehicle driver of another vehicle performs a rapid steering operation, as compared with that of the vehicle driver of the own vehicle.

It should also be noted that while the driving characteristic examples (solid lines 801 and 803) when the vehicles turn to the left at the crossings, which have been acquired from another vehicle in FIG. 8, correspond to one example as to the driving characteristics acquired from another vehicle, other characteristics as the driving characteristics may be alternatively acquired so as to present various sorts of information to the vehicle driver of the own vehicle.

For instance, a driving characteristic example in such a case that a preceding drive vehicle performs a braking operation may be alternatively acquired. In such a case that the own vehicle is being driven on a single lane as a traffic environment under which the own vehicle is traveled and also a preceding drive vehicle is traveled, such a driving characteristic is received from the preceding drive vehicle, and a difference between the received driving characteristic and the driving characteristic of the own vehicle is judged, while the received driving characteristic is produced based upon deceleration when the own vehicle is driven under normal drive condition (for example, when own vehicle is driven at constant velocity for 10 seconds, or longer time), and a degree distribution of times when the speed of the own vehicle has been reduced at this deceleration. This driving characteristic is received only one time, for example, when the preceding drive vehicles are replaced with each other. In such a case that when the driving characteristic of the own vehicle is compared with the driving characteristic of the preceding drive vehicle, such a trend is judged that the preceding drive vehicle performs a rapid braking operation during speed decelerating operation, as compared with that of the own vehicle, for instance, this trend may be presented to the vehicle driver of the own vehicle.

Figure 12:
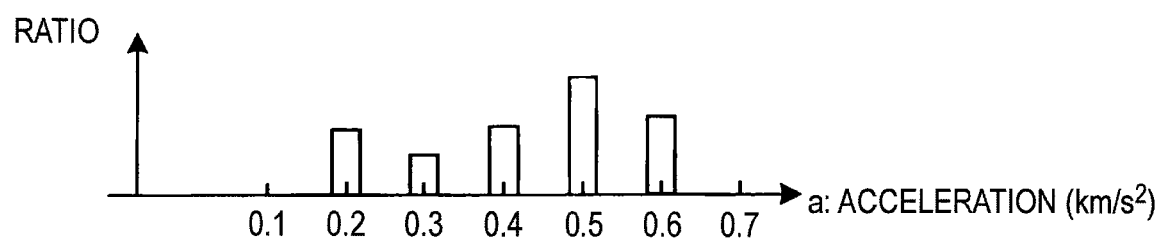
FIG. 12 is a diagram for indicating an example of a driving is characteristic related to a vehicle driver manipulates a brake pedal when the vehicle is driven under normal drive condition, which is acquired from the preceding drive vehicle by the dangerous drive predicting apparatus according to the second embodiment of the present invention.

FIG. 12 represents an example as to a driving characteristic acquired from a preceding drive vehicle by the own vehicle, while the driving characteristic is produced based upon deceleration when the preceding drive vehicle is driven under normal drive condition, and a degree distribution of times when the speed of the preceding drive vehicle has been reduced at this deceleration. FIG. 12 represents such a trend that during the normal drive condition, the speed of the preceding drive vehicle is frequently reduced in acceleration of 0.5 Km/sec2. If there is such a trend that during the normal drive condition, the speed of the own vehicle is reduced in acceleration of, for example, 0.4 Km/sec2, such a possibility message that the preceding drive vehicle may perform a rapid braking operation when the speed of this preceding drive vehicle is reduced may be presented.

It should also be understood that in the above example, the driving characteristic acquired when the preceding drive vehicle performs the braking operation has been compared with the driving characteristic acquired when the own vehicle performs the braking operation. Alternatively, in such a case that since the driving characteristic acquired when the preceding drive vehicle performs the braking operation is compared with a previously defined ideal driving characteristic (for example, vehicle speed is reduced in acceleration of 0.3 Km/sec2), it is so judged that a vehicle driver of another vehicle is performing a more dangerous drive, as compared with the ideal driving characteristic, for instance, this judgement result may be presented to the vehicle driver of the own vehicle. Further, in other examples, instead of the comparison with other vehicles, it is possible to be compared with the ideal driving characteristic.

Also, a driving characteristic example in such a case that a preceding drive vehicle enters a parking lot, or the like (parking lot, shop etc.) located along a road may be alternatively acquired. In the case where while the own vehicle is being driven on a single lane as a traffic environment, a preceding drive vehicle is traveled, and there is a parking lot, or the like located around the own vehicle, such a driving characteristic is received from the preceding vehicle, and a judgement is made of a difference between the acquired driving characteristic of the preceding drive vehicle and the driving characteristic of the own vehicle. The above-described driving characteristic acquired from the preceding drive vehicles is produced based upon speeds every distance measured up to the parking lot or the like; winker instruction situations; and a change in steering angles. This driving characteristic is received only 1 time, for instance, when the preceding drive vehicles are replaced with each other. When presence of the below-mentioned trends is judged, for example, this judgement result may be alternatively presented to the vehicle driver of the own vehicle. As the above-described trends, the preceding drive vehicles enter the parking lot, or the like, which are located along the road without instructing the winker lights. Otherwise, when the driving characteristic of the own vehicle is compared with the driving characteristic of the preceding drive vehicle, if the following trends are judged that the preceding drive vehicle performs a rapid braking operation, issues a winker instruction with a delay, or enters the parking lot, or the like by rapidly manipulating the steering wheel, then this judgement result may be alternatively presented to the vehicle driver of the own vehicle.

FIG. 13(a) shows an example as to a driving characteristic acquired from a preceding drive vehicle by the own vehicle, while the driving characteristic is produced based upon speeds with respect to distances measured up to a parking lot. FIG. 13(a) represents such a trend that a speed of the preceding drive vehicle is reduced at a place located in front of the parking lot by 30 m. If there is such a trend that a speed of the own vehicle is reduced at a place in front of the parking lot by a distance shorter than 30 m, then such a possibility message that the preceding drive vehicle enters the parking lot by performing a rapid braking operation may be presented.

FIG. 13(b) shows an example as to a driving characteristic acquired from a preceding drive vehicle by the own vehicle, while the driving characteristic is produced based upon winker instruction situations with respect to distances measured up to a parking lot, FIG. 13(b) represents such a trend that the preceding drive vehicle manipulates the winker at a place located in front of the parking lot by 30 m. If there is such a trend that the own vehicle manipulates the winker at a place in front of the parking lot by a distance shorter than 30 m, then such a possibility message that the preceding drive vehicle enters the parking lot by performing a rapid winker instruction operation may be presented.

FIG. 13(c) shows an example as to a driving characteristic acquired from a preceding drive vehicle by the own vehicle, while the driving characteristic is produced based upon changes in steering angles with respect to distances measured up to a parking lot. FIG. 13(c) represents such a trend that the preceding drive vehicle manipulates the steering wheel at a place located just before the parking lot. If there is such a trend that the own vehicle starts to manipulate the steering wheel in advance, then such a possibility message that the preceding drive vehicle enters the parking lot by performing a rapid braking operation may be presented.

Also, alternatively, it is possible to acquire a driving characteristic example in a signal light transition (yellow signal light, arrow signal light etc.) of a preceding drive vehicle. While the own vehicle approaches a signal light transition of a signal mechanism (for instance, distance between vehicle and signal mechanism is shorter than, or equal to 50 m) as a traffic environment under which the own vehicle is located, in such a case that a signal light of the signal mechanism tries to be turned (for instance, signal light of signal mechanism is changed form yellow light to blue light) and a preceding drive vehicle is driven, such a driving characteristic is received which is produced based upon signal light situations of signal mechanisms very distance measured from the preceding drive vehicle up to the signal mechanisms and a change in speeds, and then, a judgement is made of a difference between the received driving characteristic and the driving characteristic of the own vehicle. This driving characteristic is received only 1 time, for instance, when the preceding drive vehicles are replaced with each other, or every time a condition can be satisfied. When such a trend is judged that a preceding drive vehicle tries to cross a crossing by force at a signal light transition, or the preceding drive vehicle tries to turn at the crossing, for example, such a judgement result may be presented to the vehicle driver of the own vehicle.

Figure 14A:
FIG. 14 is a diagram for indicating an example of a driving characteristic related to operation when a signal light is turned, which is acquired from the preceding drive vehicle by the dangerous drive predicting apparatus according to the second embodiment of the present invention.
Figure 14A:
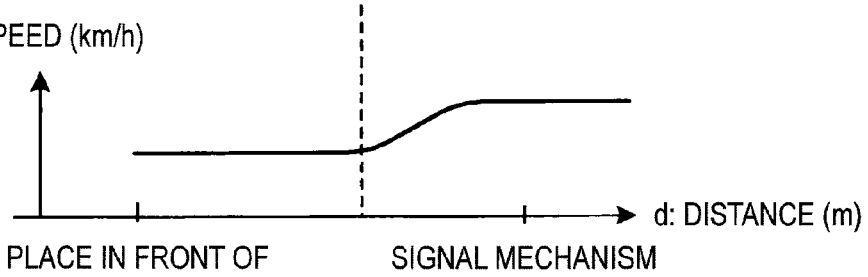

FIG. 14(a) shows one example of a signal light turning situation with respect to distances up to a signal mechanism, which is acquired from a preceding drive vehicle by the own vehicle, and FIG. 14(b) shows an example as to a driving characteristic acquired from the preceding drive vehicle by the own vehicle, while the driving characteristic is produced based upon speeds with respect to distances measured up to the signal mechanism. FIG. 14 represents such a trend that a speed of the preceding drive vehicle is increased when the signal light is changed from blue to yellow lights in such a case that the signal light of the signal mechanism is changed in this order from blue, yellow, and red colors. If there is such a trend that a speed of the own vehicle is increased when the signal light is changed from, for example, blue to yellow lights, then such a possibility message that the preceding drive vehicle tries to cross a crossing by force may be presented.

Also, it is possible to acquire a driving characteristic example when a preceding drive vehicle changes a drive lane in such a case that a vehicle-to-vehicle distance between the own vehicle and the preceding drive vehicle is short. In this case, the above-described preceding drive vehicle implies any one of the below-mentioned vehicles, namely, a preceding drive vehicle which is being driven on the same lane as the own vehicle; and another preceding drive vehicle which is being driven in the same traveling direction as the lane along which the vehicle where the dangerous drive predicting apparatus has been mounted is being driven, and furthermore, another preceding drive vehicle which is being driven on any one adjoining lane of right and left lanes with respect to the traveling direction. In such a case that as a traffic environment where the own vehicle is positioned, the own vehicle is being traveled on a single lane and further a preceding drive vehicle is present, the driving characteristic transmitting/receiving section 150 receives the below-mentioned driving characteristic from the preceding drive vehicle, and the driving characteristic difference judging section 160 judges a difference between the received driving characteristic and the driving characteristic of the own vehicle. The above-described driving characteristic is produced based upon a break-in space (vehicle-to-vehicle distance) of an adjoining lane, and a degree distribution of a total lane changing time within this vehicle-to-vehicle distance. The receiving operation of this driving characteristic is carried out only 1 time, for instance, when the preceding drive vehicles are replaced with each other. When the driving characteristic difference judging section 160 judges the below-mentioned trend, for instance, the driving characteristic difference providing section 170 may present this trend with respect to the vehicle driver of the own vehicle: there is such a trend that even when a vehicle-to-vehicle distance between the own vehicle and the preceding drive vehicle is more or less short, a vehicle present in an adjacent lane changes a drive lane by force.

Figure 15:
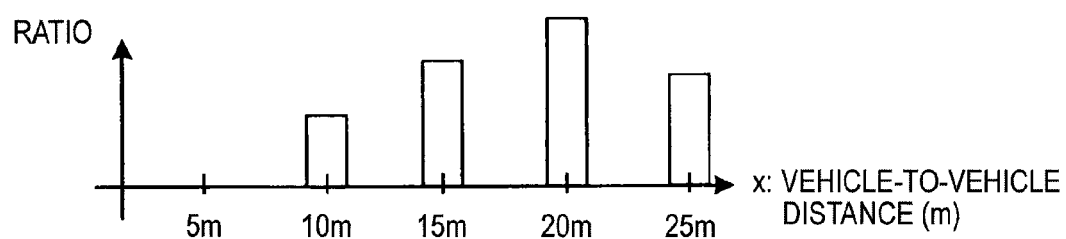
FIG. 15 is a diagram for indicating an example of a driving characteristic related to operation when the vehicle changes a drive lane in such a case that a vehicle-to-vehicle distance is short, which is acquired from the preceding drive vehicle by the dangerous drive predicting apparatus according to the second embodiment of the present invention.

FIG. 15 represents an example as to a driving characteristic acquired from a preceding drive vehicle by the own vehicle, while the driving characteristic is produced based upon a break-in space of an adjacent lane, and a degree distribution of times when the preceding drive vehicle has changed drive lanes within the break-in space. FIG. 15 represents such a trend that the preceding drive vehicle frequently changes the drive lanes when a vehicle-to-vehicle distance becomes 20 m. If there is such a trend that the own vehicle changes the drive lane when a vehicle-to vehicle distance becomes, for example, 25 m, then such a possibility message that a vehicle located on the adjacent lane changes a drive lane by force may be presented.

Also, it is possible to acquire a driving characteristic example related to a temporal stop while an intersecting vehicle is driven on a non-priority-sided road. In this case, the non-priority-sided road implies such a road that a stop line is present at a crossing, or a red signal light of a signal mechanism is turned ON in a flicker manner. In such a case that the own vehicle is being driven on a priority-sided road (namely, such a road that stop line is not present at crossing, or yellow light of signal mechanism is turned ON in flicker manner) as a traffic environment where the own vehicle is located, and furthermore, an intersecting vehicle is present, the driving characteristic transmitting/receiving section 150 receives the below-mentioned driving characteristic from the intersecting vehicle, and then the driving characteristic difference judging section 160 judges a difference between the received driving characteristic and the driving characteristic of the own vehicle. The above-described driving characteristic is produced based upon both signal light turning situations every distance up to the stop line (temporary stop line) under such a situation that the preceding drive vehicle is present, and a change in speeds thereof. The above-explained driving characteristic is received, for example, when the own vehicle has reached a place located in front of a crossing by 50 m. If such a trend is judged that the intersecting vehicle which is being driven on the non-priority-sided road enters the crossing without temporarily stopping the own intersecting vehicle, then such a judgement result may be presented to the vehicle driver of the own vehicle.

Figure 16:
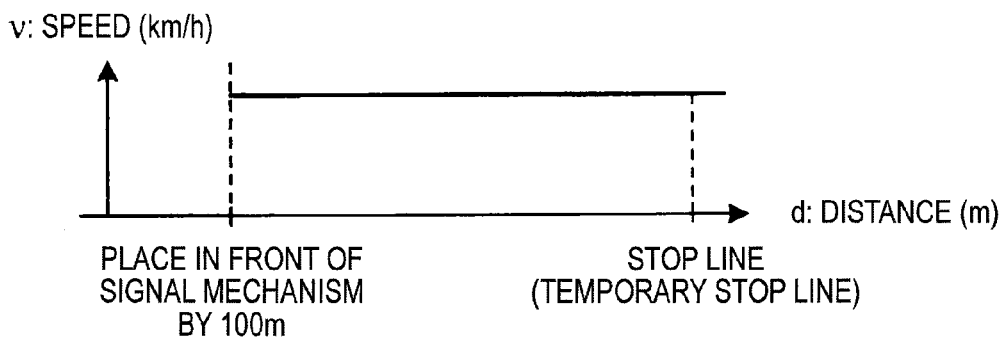
FIG. 16 is a diagram for showing an example of a driving characteristic related to operation when the vehicle temporarily stops while the vehicle is being driven on a non-priority-sided road, which is acquired from an intersecting vehicle by the dangerous drive predicting apparatus according to the second embodiment of the present invention.

FIG. 16 shows an example as to a driving characteristic acquired from an intersecting vehicle by the own vehicle, while the driving characteristic is produced based upon a change in speeds with respect to distances measured up to a stop line. FIG. 16 represents such a trend that the intersecting vehicle passes through a crossing while the intersecting vehicle does not completely reduce the vehicle speed at all until this intersecting vehicle is driven from a place located in front of the stop line by 100 m and then passes through the stop line. Since the acquired driving characteristic is compared with a previously defined ideal driving characteristic, such a possibility message that the intersecting vehicle passes through the crossing without completely reducing the vehicle speed thereof can be presented.

As previously described, various sorts of these driving characteristics are acquired from other vehicles, so that the vehicle driver can drive the vehicle in a safer manner.

Also, it is possible to acquire a driving characteristic related to a speed of a preceding drive vehicle when the preceding drive vehicle is driven under normal drive condition. In such a case that a preceding drive vehicle is driven as a traffic environment under which the own vehicle is located, the driving characteristic transmitting/receiving section 150 receives the following driving characteristic from the preceding drive vehicle, and then, the driving characteristic difference judging section 160 judges a difference between the received driving characteristic and the driving characteristic of the own vehicle. The above-described driving characteristic is produced based upon both an averaged speed when the preceding drive vehicle is driven under the normal drive condition, and a degree distribution of times at which the preceding drive vehicle has been driven at this averaged speed. The receiving operation of this driving characteristic is carried out only 1 time, for instance, when the preceding drive vehicles are replaced with each other. When the driving characteristic difference judging section 160 judges that the preceding drive vehicle is driven at an extremely low speed, for instance, this judgement result may be presented to the vehicle driver of the own vehicle.

Figure 17:
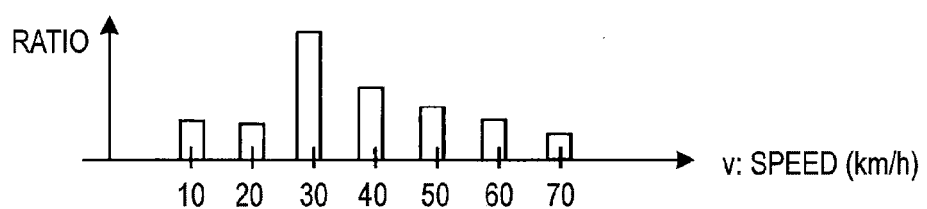
FIG. 17 is a diagram for indicating an example of a driving characteristic related to a vehicle speed when the vehicle is driven under normal drive condition, which is acquired from the preceding vehicle by the dangerous drive predicting apparatus according to the second embodiment of the present invention.

FIG. 17 shows one example as to such a driving characteristic which is acquired from a preceding drive vehicle by the own vehicle, while the above-described driving characteristic is produced based upon an averaged speed when the preceding drive vehicle is driven under the normal drive condition, and a degree distribution of times at which the preceding drive vehicle has been driven at this averaged speed. FIG. 17 represents such a trend that the preceding drive vehicle is frequently driven, assuming now that the averaged speed when the preceding drive vehicle is driven under the normal drive condition is 30 Km/hour. If there is such a trend that the own vehicle is driven, assuming now that an averaged speed during the normal drive condition of the own vehicle is 50 Km/hour, such a possibility message that the preceding drive vehicle is driven at an extremely low speed may be presented.

Also, it is possible to acquire such a driving characteristic related to a speed of a succeeding drive vehicle during the normal drive condition, and a vehicle-to-vehicle distance during this normal drive condition. In such a case that a succeeding drive vehicle is driven as a traffic environment where the own vehicle is located, the driving characteristic transmitting/receiving section 150 receives the following driving characteristics from the succeeding drive vehicle, and then, the driving characteristic difference judging section 160 judges a difference between the received driving characteristics and the driving characteristic of the own vehicle. The above-described driving characteristics correspond to a driving characteristic produced based upon both an averaged speed of the succeeding drive vehicle during the normal drive condition and a degree distribution of times at which the succeeding drive vehicle has been driven at this averaged speed, and another driving characteristic produced based upon both a vehicle-to-vehicle distance between a preceding drive vehicle and the succeeding drive vehicle and a degree distribution of times at which the succeeding drive vehicle has been driven by keeping this vehicle-to-vehicle distance with respect to the preceding drive vehicle. The receiving operation of this driving characteristic is carried out only 1 time, for instance, when the succeeding drive vehicles are replaced with each other. When the driving characteristic difference judging section 160 judges that a succeeding drive vehicle is driven at an extremely high speed, or is driven by extremely reducing the vehicle-to-vehicle distance, for instance, such a judgement result may be presented to the vehicle driver of the own vehicle.

Figure 18A:
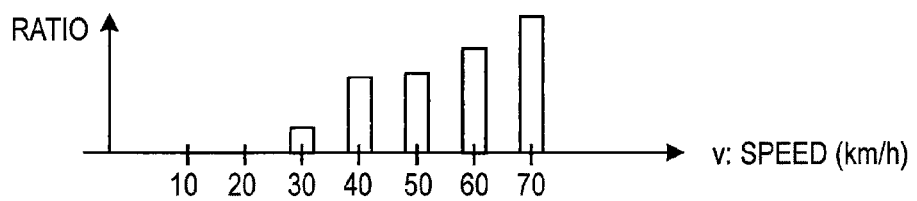
FIG. 18 is a diagram for indicating an example of a driving characteristic related to a vehicle-to-vehicle distance and a vehicle speed when the vehicle is driven under normal drive condition, which is acquired from the succeeding drive vehicle by the dangerous drive predicting apparatus according to the second embodiment of the present invention.

FIG. 18(a) shows one example as to such a driving characteristic which is acquired from a succeeding drive vehicle by the own vehicle, while the above-described driving characteristic is produced based upon an averaged speed when the succeeding drive vehicle is driven under the normal drive condition, and a degree distribution of times at which the succeeding drive vehicle has been driven at this averaged speed. FIG. 18(a) represents such a trend that the succeeding drive vehicle is frequently driven, assuming now that the averaged speed when the succeeding drive vehicle is driven under the normal drive condition is 70 Km/hour. If there is such a trend that the own vehicle is driven, assuming now that an averaged speed during the normal drive condition of the own vehicle is 50 Km/hour, such a possibility message that the succeeding drive vehicle is driven at an extremely high speed may be presented.

Figure 18B:
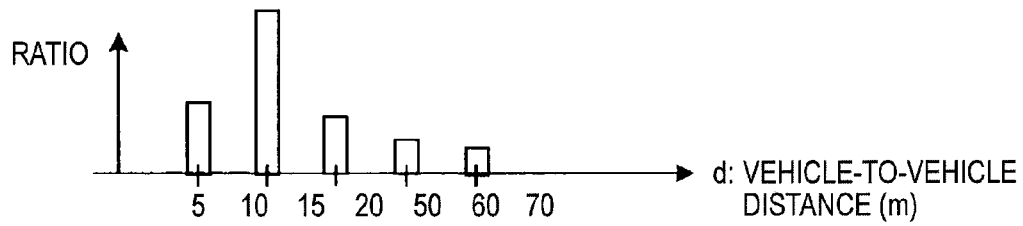

FIG. 18(b) shows one example as to such a driving characteristic which is acquired from a succeeding drive vehicle by the own vehicle, while the above-described driving characteristic is produced based upon a vehicle-to-vehicle distance between the preceding drive vehicle and the own vehicle, and a degree distribution of times at which the succeeding drive vehicle has been driven by keeping this vehicle-to-vehicle distance with respect to the preceding drive vehicle. FIG. 18(b) represents such a trend that the succeeding drive vehicle is frequently driven, assuming now that when the succeeding drive vehicle is driven under the normal drive condition, a vehicle-to-vehicle distance with respect to a preceding drive vehicle is 10 m. If there is such a trend that the own vehicle is driven, assuming now that a vehicle-to-vehicle distance during the normal drive condition of the own vehicle is, for instance, 20 m, then such a possibility message that the succeeding drive vehicle is driven by extremely reducing the vehicle-to-vehicle distance may be presented.

As previously described, various sorts of these driving characteristics are acquired from other vehicles, so that the vehicle driver can drive the vehicle in a more comfortable manner, and utilization can be improved.

In accordance with such a dangerous drive predicting apparatus 600 described in the second embodiment of the present invention, the dangerous drive predicting apparatus 600 is arranged by employing the below-mentioned section, so that other vehicles can quickly recognize future situations of the own vehicle. That is, the above-described dangerous drive predicting apparatus 600 is arranged by: the drive information detecting section 610 for detecting drive information containing drive actions which cover operation for a first vehicle by a vehicle driver; the traffic environment detecting section 120 for detecting a traffic environment around the first vehicle; the driving characteristic producing/storing section 130 for producing a driving characteristic indicative of a trend of operation actions by the vehicle drivers every vehicle driver who executes the drive action and every traffic environment under which the drive action is carried out based upon both the drive information detected by the drive information detecting section 610 and the traffic environment detected by the traffic environment detecting section 120, and for storing thereinto the produced driving characteristic; and also, a driving characteristic transmitting unit for transmitting the driving characteristic stored in the driving characteristic producing/storing section 130 to a second vehicle.

While the present invention has been described in detail, or with reference to the specific embodiments, it is apparent for ordinarily skilled engineers that the present invention may be modified and changed in various manners without departing from the inventive idea and the technical scope of the present invention.

The present application is based on Japan Patent Application No. 2005-360759 filed on Dec. 14, 2005, the contents of which are incorporated herein for reference.

INDUSTRIAL APPLICABILITY

The present invention has been suitably utilized as a dangerous drive predicting apparatus, a navigation system mounted on a vehicle, a safe driving assisting system, and the like, which are capable of rapidly recognizing a future situation of the own vehicle by other vehicles.

The invention claimed is:

1. A dangerous drive predicting apparatus, comprising:
a drive information detecting section that detects drive information which includes at least one of a drive action and vehicle information, the drive action having an operation to a first vehicle by a vehicle driver, and the vehicle information having a condition of the first vehicle in connection with the drive action;
a traffic environment detecting section that detects a traffic environment around the first vehicle;
a driving characteristic producing section that produces a driving characteristic indicative of a trend of the drive action by the vehicle driver every traffic environment under which the drive action is carried out on the basis of the drive information detected by the drive information detecting section and the traffic environment detected by the traffic environment detecting section;
a driving characteristic storage section that stores the driving characteristic produced by the driving characteristic producing section; and
a driving characteristic transmitting section that transmits the driving characteristic to a second vehicle, in a case that the driving characteristic stored in the driving characteristic storage section is different from a driving characteristic related to a previously determined safe driving.

2. The dangerous drive predicting apparatus according to claim 1, wherein the driving characteristic producing section produces the driving characteristic with respect to each of the vehicle drivers, who executes the drive action.

3. The dangerous drive predicting apparatus according to claim 1, further comprising:
a drive condition predicting section that predicts a drive condition under a future traffic environment in accordance with the drive information and the traffic environment on the basis of the driving characteristic,
wherein the driving characteristic transmitting section transmits the driving characteristic corresponding to the drive condition to the second vehicle.

4. A dangerous drive predicting apparatus, comprising:
a drive information detecting section that detects drive information which includes at least one of a drive action and vehicle information, the drive action having an operation to a first vehicle by a vehicle driver, and the vehicle information having a condition of the first vehicle in connection with the drive action;
a traffic environment detecting section that detects a traffic environment around the first vehicle;
a driving characteristic producing section that produces a driving characteristic indicative of a trend of the drive action by the vehicle driver every traffic environment under which the drive action is carried out on the basis of the drive information detected by the drive information detecting section and the traffic environment detected by the traffic environment detecting section;
a driving characteristic storage section that stores the driving characteristic produced by the driving characteristic producing section;
a driving characteristic receiving section that receives another vehicle driving characteristic indicative of a driving characteristic of a second vehicle which is transmitted from the second vehicle; and
a dangerous driving judging section that judges that there is a possibility of the dangerous drive in the second vehicle in a case that the another vehicle driving characteristic received by the driving characteristic receiving section is different from a driving characteristic related to a previously determined safe driving.

5. A dangerous drive predicting apparatus, comprising:
a drive information detecting section that detects drive information which includes at least one of a drive action and vehicle information, the drive action having an operation to a first vehicle by a vehicle driver, and the vehicle information having a condition of the first vehicle in connection with the drive action;
a traffic environment detecting section that detects a traffic environment around the first vehicle;
a driving characteristic producing section that produces a driving characteristic indicative of a trend of the drive action by the vehicle driver every traffic environment under which the drive action is carried out on the basis of the drive information detected by the drive information detecting section and the traffic environment detected by the traffic environment detecting section;
a driving characteristic storage section that stores the driving characteristic produced by the driving characteristic producing section;
a driving characteristic receiving section that receives another vehicle driving characteristic indicative of a driving characteristic of a second vehicle which is transmitted from the second vehicle;
a driving characteristic difference judging section that compares the another vehicle driving characteristic received by the driving characteristic receiving section with the driving characteristic stored in the driving characteristic storage section and classified in accordance with a traffic environment identical to a traffic environment of the another vehicle driving characteristics so as to judge a difference between the another vehicle characteristic and the stored driving characteristic; and
a driving characteristic difference providing section that provides the difference judged by the driving characteristic difference judging section with respect to the vehicle driver.

6. The dangerous drive predicting apparatus according to claim 4, wherein the driving characteristic producing section produces the driving characteristic with respect to each of the vehicle drivers, who executes the drive action.

7. The dangerous drive predicting apparatus according to claim 5, wherein the driving characteristic producing section produces the driving characteristic with respect to each of the vehicle drivers, who executes the drive action.

8. The dangerous drive predicting apparatus according to claim 5, wherein in a case that the another vehicle driving characteristic received by the driving characteristic receiving section is different from a driving characteristic related to a previously determined safe driving, the driving characteristic difference providing section provides difference information related to the difference judged by the driving characteristic difference judging section.

9. The dangerous drive predicting apparatus according to claim 1, wherein the drive action includes at least one of an accelerator manipulating operation, a braking operation, a steering wheel manipulating operation, a winker manipulating operation, and a safety confirming operation with respect to the first vehicle; and
wherein the driving characteristic producing section produces the driving characteristic related to at least one of the accelerator manipulating operation, the braking operation, the steering wheel manipulating operation, the winker manipulating operation, and the safety confirming operation.

10. The dangerous drive predicting apparatus according to claim 1, wherein the vehicle information includes at least one of vehicle speed information related to a vehicle speed of the first vehicle, acceleration information related to acceleration thereof, steering angle information related to a steering angle thereof, vehicle position information related to a vehicle position thereof, and vehicle-to-vehicle distance information related to a vehicle-to-vehicle distance thereof; and wherein the driving characteristic producing section produces the driving characteristic related to at least one of the vehicle speed information, the acceleration information, the steering angle information, the vehicle position information, and the vehicle-to-vehicle information.

11. The dangerous drive predicting apparatus according to claim 4, wherein the driving characteristic receiving section receives the another vehicle driving characteristic related to at least one of an accelerator manipulating operation, a braking operation, a steering wheel manipulating operation, a winker manipulating operation, and a safety confirming operation with respect to the second vehicle.

12. The dangerous drive predicting apparatus according to claim 5, wherein the driving characteristic receiving section receives the another vehicle driving characteristic related to at least one of an accelerator manipulating operation, a braking operation, a steering wheel manipulating operation, a winker manipulating operation, and a safety confirming operation with respect to the second vehicle.

13. The dangerous drive predicting apparatus according to claim 5, wherein the driving characteristic difference judging section compares the another vehicle driving characteristic with a driving characteristic stored in the driving characteristic storage section, which corresponds to the another vehicle driving characteristic; and in a case that a result of the comparison indicates that a difference is larger than or equal to a predetermined constant value, the driving characteristic difference judging section judges that the difference is present in the driving characteristic.

14. The dangerous drive predicting apparatus according to claim 4, wherein the driving characteristic receiving section receives the another vehicle driving characteristic related to at least one of vehicle speed information related to a vehicle speed of the second vehicle, acceleration information related to acceleration thereof, steering angle information related to a steering angle thereof, vehicle position information related to a vehicle position thereof, and vehicle-to-vehicle distance information related to a vehicle-to-vehicle distance thereof.

15. The dangerous drive predicting apparatus according to claim 5, wherein the driving characteristic receiving section receives the another vehicle driving characteristic related to at least one of vehicle speed information related to a vehicle speed of the second vehicle, acceleration information related to acceleration thereof, steering angle information related to a steering angle thereof, vehicle position information related to a vehicle position thereof, and vehicle-to-vehicle distance information related to a vehicle-to-vehicle distance thereof.

16. The dangerous drive predicting apparatus according to claim 5, wherein the driving characteristic difference judging section compares the another vehicle driving characteristic with a driving characteristic stored in the driving characteristic storage section, which corresponds to the another vehicle driving characteristic; and in a case that a result of the comparison indicates that a difference is larger than or equal to a predetermined constant value, the driving characteristic difference judging section judges that the difference is present in the driving characteristic.

17. A dangerous drive predicting method, comprising:

a drive information detecting step for detecting drive information which includes at least one of a drive action and vehicle information, the drive action having an operation to a first vehicle by a vehicle driver, and the vehicle information having a condition of the first vehicle in connection with the drive action;

a traffic environment detecting step for detecting a traffic environment around the first vehicle;

a driving characteristic producing step for producing a driving characteristic indicative of a trend of the drive action by the vehicle driver every traffic environment under which the drive action is carried out on the basis of the drive information detected by the drive information detecting step and the traffic environment detected by the traffic environment detecting step;

a driving characteristic storing step for storing the driving characteristic produced by the driving characteristic producing step; and a driving characteristic transmitting step for transmitting the driving characteristic to a second vehicle in a case that the driving characteristic stored in the driving characteristic storage section is different from a driving characteristic related to a previously determined safe driving.

18. A dangerous drive predicting method, comprising:

a drive information detecting step for detecting drive information which includes at least one of a drive action and vehicle information, the drive action having an operation to a first vehicle by a vehicle driver, and the vehicle information having a condition of the first vehicle in connection with the drive action;

a traffic environment detecting step for detecting a traffic environment around the first vehicle;

a driving characteristic producing step for producing a driving characteristic indicative of a trend of the drive action by the vehicle driver every traffic environment under which the drive action is carried out on the basis of the drive information detected by the drive information detecting step and the traffic environment detected by the traffic environment detecting step;

a driving characteristic storing step for storing the driving characteristic produced by the driving characteristic producing step;

a driving characteristic receiving step for receiving another vehicle driving characteristic indicative of a driving characteristic of a second vehicle which is transmitted from the second vehicle; and a dangerous driving judging step for judging that there is a possibility of the dangerous drive in the second vehicle in a case that the another vehicle driving characteristic received by the driving characteristic receiving section is different from a driving characteristic related to a previously determined safe driving.

19. A dangerous drive predicting method, comprising:

a drive information detecting step for detecting drive information which includes at least one of a drive action and vehicle information, the drive action having an operation to a first vehicle by a vehicle driver, and the vehicle information having a condition of the first vehicle in connection with the drive action;

a traffic environment detecting step for detecting a traffic environment around the first vehicle;

a driving characteristic producing step for producing a driving characteristic indicative of a trend of the drive action by the vehicle driver every traffic environment under which the drive action is carried out on the basis of the drive information detected by the drive information detecting step and the traffic environment detected by the traffic environment detecting step;

a driving characteristic storing step for storing the driving characteristic produced by the driving characteristic producing step;

a driving characteristic receiving step for receiving another vehicle driving characteristic indicative of a driving characteristic of a second vehicle which is transmitted from the second vehicle;

a driving characteristic difference judging step for comparing the another vehicle driving characteristic received by the driving characteristic receiving step with the driving characteristic stored and classified in accordance with a traffic environment identical to a traffic environment of the another vehicle driving characteristics so as to judge a difference between the another vehicle characteristic and the stored driving characteristic; and a providing step for providing the difference judged by the driving characteristic difference fudging step with respect to the vehicle driver.

\* \* \* \* \*